(12) United States Patent
Yoo et al.

(10) Patent No.: US 11,563,542 B2
(45) Date of Patent: Jan. 24, 2023

(54) APPARATUS AND METHOD FOR PERFORMING INITIAL ACCESS IN WIRELESS COMMUNICATION SYSTEM

(71) Applicant: Samsung Electronics Co., Ltd., Suwon-si (KR)

(72) Inventors: Hyunil Yoo, Suwon-si (KR); Taeyoung Kim, Seoul (KR); Jeehwan Noh, Suwon-si (KR); Jong Bu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/934,344

(22) Filed: Mar. 23, 2018

(65) Prior Publication Data

US 2018/0279361 A1 Sep. 27, 2018

(30) Foreign Application Priority Data

Mar. 23, 2017 (KR) .................. 10-2017-0037166

(51) Int. Cl.
*H04L 5/00* (2006.01)
*H04L 27/26* (2006.01)
*H04W 74/00* (2009.01)
*H04W 72/04* (2009.01)
(Continued)

(52) U.S. Cl.
CPC .......... *H04L 5/0053* (2013.01); *H04L 5/0051* (2013.01); *H04L 27/2602* (2013.01); *H04L 27/2646* (2013.01); *H04W 72/042* (2013.01); *H04W 74/006* (2013.01);
(Continued)

(58) Field of Classification Search
CPC . H04L 27/26; H04L 27/2636; H04L 27/2646; H04L 5/001
See application file for complete search history.

(56) References Cited

U.S. PATENT DOCUMENTS 7,606,138 B2 * 10/2009 Wang .................. H04L 27/2607
370/208
11,265,059 B2 * 3/2022 Yang ........................ H04B 7/06
(Continued)

FOREIGN PATENT DOCUMENTS

| KR | 10-2014-0107185 A | 9/2014 |
| KR | 10-2015-0045350 A | 4/2015 |
| WO | 2017053048 A1 | 3/2017 |

OTHER PUBLICATIONS

3GPP; Way Forward for the Numerology in NR RA Procedures; CATT, [ . . . ],; 3GPP TSG RAN WG1#90; R1-1714963; Aug. 21-25, 2017; Prague, Czech Republic.
(Continued)

*Primary Examiner* — Khaled M Kassim
*Assistant Examiner* — Berhanu D Belete
(74) *Attorney, Agent, or Firm* — Jefferson IP Law, LLP

(57) ABSTRACT

A method for operating a terminal in a wireless communication system is provided. The method includes receiving, from a base station, system information comprising information indicating a waveform for a second message, transmitting, to the base station, a random access preamble signal, receiving, from the base station, a first message comprising a random access response, and transmitting, to the base station, the second message using a resource allocated by the first message.

16 Claims, 32 Drawing Sheets

(51) Int. Cl.
*H04W 74/08* (2009.01)
*H04W 48/08* (2009.01)

(52) U.S. Cl.
CPC ......... *H04W 74/0833* (2013.01); *H04L 5/001* (2013.01); *H04L 27/2636* (2013.01); *H04W 48/08* (2013.01)

(56) References Cited

U.S. PATENT DOCUMENTS

| | | | | |
|---|---|---|---|---|
| 2007/0263738 | A1* | 11/2007 | Jitsukawa | H04L 5/0048 375/260 |
| 2012/0163305 | A1 | 6/2012 | Nimbalker et al. | |
| 2013/0343307 | A1* | 12/2013 | Desai | H04W 74/04 370/329 |
| 2015/0043324 | A1* | 2/2015 | Oga | H04L 27/2628 370/330 |
| 2015/0045350 | A1 | 2/2015 | Friedhoff | |
| 2015/0257175 | A1 | 9/2015 | Ma et al. | |
| 2016/0242132 | A1 | 8/2016 | Bae et al. | |
| 2016/0374068 | A1* | 12/2016 | Kim | H04W 72/04 |
| 2017/0006637 | A1 | 1/2017 | Sahlin et al. | |
| 2017/0303241 | A1* | 10/2017 | Yang | H04L 5/0053 |
| 2018/0083751 | A1* | 3/2018 | Seo | H04L 5/0048 |
| 2018/0110051 | A1* | 4/2018 | Lee | H04L 5/0037 |
| 2018/0116000 | A1* | 4/2018 | Ly | H04W 74/0833 |
| 2018/0139785 | A1* | 5/2018 | Zhang | H04L 27/0008 |
| 2018/0160448 | A1* | 6/2018 | Blankenship | H04W 74/0833 |
| 2018/0295537 | A1* | 10/2018 | Zhang | H04W 92/14 |
| 2019/0081832 | A1* | 3/2019 | Marinier | H04L 5/0007 |
| 2019/0097859 | A1* | 3/2019 | Bala | H04L 27/26132 |
| 2019/0174525 | A1* | 6/2019 | Kwak | H04L 27/2646 |
| 2019/0174554 | A1* | 6/2019 | Deenoo | H04L 5/0048 |
| 2019/0191429 | A1* | 6/2019 | Stern-Berkowitz | H04W 56/0045 |
| 2019/0191454 | A1* | 6/2019 | Blankenship | H04W 74/0833 |
| 2019/0199553 | A1* | 6/2019 | Park | H04L 5/0094 |
| 2019/0207731 | A1* | 7/2019 | Park | H04B 7/0639 |
| 2019/0215119 | A1* | 7/2019 | Kim | H04L 5/0048 |
| 2019/0222277 | A1* | 7/2019 | Park | H04B 7/0626 |
| 2019/0230702 | A1* | 7/2019 | Zhang | H04W 56/0045 |
| 2019/0238294 | A1* | 8/2019 | Ko | H04L 27/2613 |
| 2019/0239214 | A1* | 8/2019 | Yang | H04L 5/0094 |
| 2019/0253122 | A1* | 8/2019 | Yang | H04L 5/0053 |
| 2019/0296954 | A1* | 9/2019 | Xing | H04L 27/0008 |
| 2019/0319686 | A1* | 10/2019 | Chen, IV | H04W 24/08 |
| 2019/0334751 | A1* | 10/2019 | Liu | H04L 5/0051 |
| 2019/0373644 | A1* | 12/2019 | Wang | H04W 48/12 |
| 2020/0007375 | A1* | 1/2020 | Zhang | H04L 25/0226 |
| 2020/0021419 | A1* | 1/2020 | Taherzadeh Boroujeni | H04L 5/0053 |
| 2020/0112467 | A1* | 4/2020 | Shen | H04L 27/2621 |
| 2021/0281455 | A1* | 9/2021 | Lee | H04L 27/2636 |

OTHER PUBLICATIONS

Aissam Outchakoucht et al: "Dynamic Access Control Policy based on Blockchain and Machine Learning for the Internet of Things", International Journal of Advanced Computer Science and Applications, vol. 8, No. 7, Jan. 1, 2017 (Jan. 1, 2017), XP055569041.
Aafaf Ouaddah et al: "FairAccess: a new 1-14 Blockchain-based access control framework for the Internet of Things: FairAccess: a new access control framework for IoT", Security and Communication Networks, vol. 9, No. 18, Dec. 1, 2016 (Dec. 1, 2016), pp. 5943-5964, XP055415302.
Gidofalvi et al.: "When And Where Next: 1-14 Individual Mobility Prediction", Nov. 6, 2012 (Nov. 6, 2012), p. 2012, XP055660951, Retrieved from the Internet: URL:https://people.kth.se/-gyozo/docs/08GidofalviWAWNACMGIS12CRC.pdf.
Extended European Search Report dated Jan. 31, 2020, issued in European Application No. 18788459.8.
Guangdong OPPO Mobile Telecom;, "Waveform selection for uplink control signal", 3GPP TSG RAN WG1 Meeting #87 R1-1611705, Reno, USA, Nov. 14-18, 2016.
Korean Office Action dated Jan. 26, 2021, issued in Korean Application No. 10-2017-0037166.
Korean Notice of Final Rejection dated Jul. 29, 2021, issued in Korean Application No. 10-2017-0037166.
Korean Office Action dated Sep. 23, 2021, issued in Korean Application No. 10-2017-0037166.

* cited by examiner

APPARATUS AND METHOD FOR PERFORMING INITIAL ACCESS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0037166, filed on Mar. 23, 2017, in the Korean Intellectual Property Office, the disclosure of which is incorporated by reference herein in its entirety.

TECHNICAL FIELD

The disclosure relates to a wireless communication system. More particularly, the disclosure relates to an apparatus and a method for performing initial access in the wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System.'

The 5G communication system is considered to be implemented in higher frequency (mm Wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK), quadrature amplitude modulation (FQAM), and sliding window superposition coding (SWSC) as an advanced coding modulation (ACM) have been developed, and filter bank multi carrier (FBMC), non-orthogonal multiple access (NOMA), and sparse code multiple access (SCMA) as an advanced access technology have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages described below. Accordingly, an aspect of the disclosure is to provide an apparatus and a method for effectively performing initial access in a wireless communication system.

Another aspect of the disclosure is to provide an apparatus and a method for supporting dynamic time division duplex (TDD) in a wireless communication system.

Another aspect of the disclosure is to provide an apparatus and a method for obtaining larger coverage in a wireless communication system.

Another aspect of the disclosure is to provide an apparatus and a method for determining a waveform to be applied to a message for initial access in a wireless communication system.

Another aspect of the disclosure is to provide an apparatus and a method for transmitting waveform information to be applied to a message for initial access in a wireless communication system.

Another aspect of the disclosure is to provide an apparatus and a method for reporting information required to determine a waveform to be applied to a message for initial access in a wireless communication system.

Another aspect of the disclosure is to provide an apparatus and a method for performing initial access using a signal of a waveform that is determined based on a cell environment or a system parameter in a wireless communication system.

In accordance with an aspect of the disclosure, a method for operating a terminal in a wireless communication system is provided. The method includes receiving, from a base station, system information comprising information indicating a waveform for a second message, transmitting, to the base station, a random access preamble signal, receiving, from the base station, a first message comprising a random access response, and transmitting, to the base station, the second message using a resource allocated by the first message. The random access preamble signal is transmitted using a predefined waveform, and the second message is transmitted using the waveform indicated by the information.

In accordance with another aspect of the disclosure, a method for operating a base station in a wireless communication system is provided. The method includes transmitting, to a terminal, system information comprising information indicating a waveform for a second message, receiving, from the terminal, a random access preamble signal, transmitting, to the terminal, a first message comprising a random access response, and receiving, from the terminal, the second message using a resource allocated by the first message. The random access preamble signal is transmitted using a predefined waveform, and the second message is transmitted using the waveform indicated by the information.

In accordance with another aspect of the disclosure, a terminal in a wireless communication system is provided. The terminal includes a transceiver and at least one processor connected to the transceiver. The transceiver is configured to receive, from a base station, system information comprising information indicating a waveform for a second message, transmit, to the base station, a random access preamble signal, receive, from the base station, a first message comprising a random access response, and transmit, to the base station, the second message using an resource allocated by the first message. The random access preamble signal is transmitted using a predefined waveform, and the second message is transmitted using the waveform indicated by the information.

In accordance with another aspect of the disclosure, an apparatus of a base station in a wireless communication system is provided. The apparatus includes a transceiver and at least one processor connected to the transceiver. The transceiver is configured to transmit, to a terminal, system information comprising information indicating a waveform for a second message, receive, from the terminal, a random access preamble signal, transmit, to the terminal, a first message comprising a random access response, and receive, from the terminal, the second message using a resource allocated by the first message. The random access preamble signal is transmitted using a predefined waveform, and the second message is transmitted using the waveform indicated by the information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure to be described below, a hardware approach will be described as an example. However, since the various embodiments of the disclosure include a technology using both hardware and software, the disclosure does not exclude a software-based approach.

Hereinafter, the disclosure provides an apparatus and a method for performing initial access in a wireless communication system. Specifically, the disclosure provides a technique for determining a waveform of an uplink signal used for the initial access in the wireless communication system.

Terms indicating messages or signals (e.g., a message-1 (MSG1), a message-2 (MSG2), a message-3 (MESG3), a preamble, and so on), terms indicating channels (e.g., random access channel (RACH)), terms indicating control information (e.g., system information block (SIB), master information block (MIB), and so on), terms indicating network entities, and terms indicating components of a device are mentioned for the sake of explanations. Accordingly, the disclosure is not limited to the terms to be described, and may use other terms having a technically equivalent meaning.

The disclosure provides various embodiments with terms used in some communication standards (e.g., 3rd Generation Partnership Project (3GPP)) by way of example. Various embodiments of the disclosure may be easily used in other communication systems.

Figure 1:
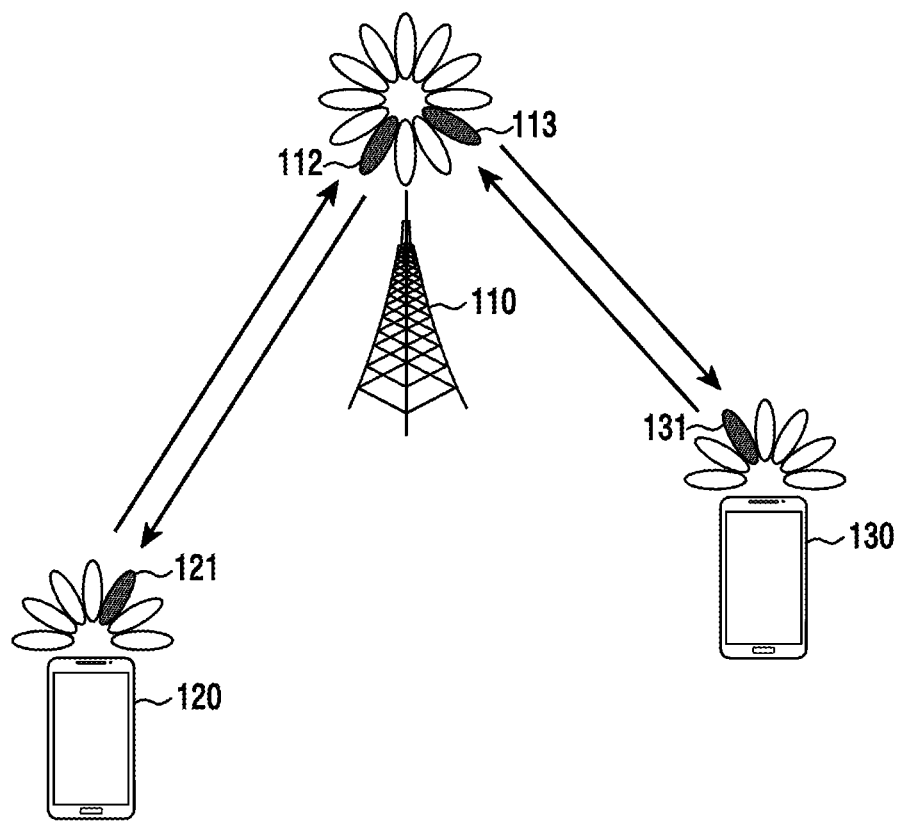
FIG. 1 illustrates a wireless communication system according to an embodiment of the disclosure.

FIG. 1 illustrates a wireless communication system according to an embodiment of the disclosure.

Referring to FIG. 1, FIG. 1 depicts a base station 110, a terminal 120, and a terminal 130, as some of nodes which use a radio channel in the wireless communication system. While FIG. 1 depicts the single base station alone, the same or similar base station to the base station 110 may be further included.

The base station 110 is a network infrastructure which provides a radio access to the terminals 120 and 130. The base station 110 has coverage defined as a geographical area, based on a distance of signal transmission. The base station 110 may be referred to as an access point (AP), an eNodeB (eNB), a 5th generation node (5G node), a wireless point, a transmission/reception point (TRP), or other term having a technically equivalent meaning.

The terminal 120 and the terminal 130 are used by a user and communicate with the base station 110 over a radio channel. In some cases, at least one of the terminal 120 and the terminal 130 may operate without a user's involvement. That is, at least one of the terminal 120 and the terminal 130 performs machine type communication (MTC) and may not be carried by the user. The terminal 120 and the terminal 130 each may be referred to as a user equipment (UE), a mobile station, a subscriber station, a remote terminal, a wireless terminal, a user device, or other term having a technically equivalent meaning.

The base station 110, the terminal 120, and the terminal 130 may transmit and receive radio signals in a millimeter wave (mm Wave) band (e.g., 28 GHz, 30 GHz, 38 GHz, and 60 GHz). In so doing, to improve channel gain, the base station 110, the terminal 120, and the terminal 130 may conduct beamforming. Herein, beamforming includes transmit beamforming and receive beamforming. That is, the base station 110, the terminal 120, and the terminal 130 may apply directivity to a transmit signal or a receive signal. For doing so, the base station 110, the terminal 120, and the terminal 130 may select serving beams 112, 113, 121, and 131 through a beam search.

Figure 2:
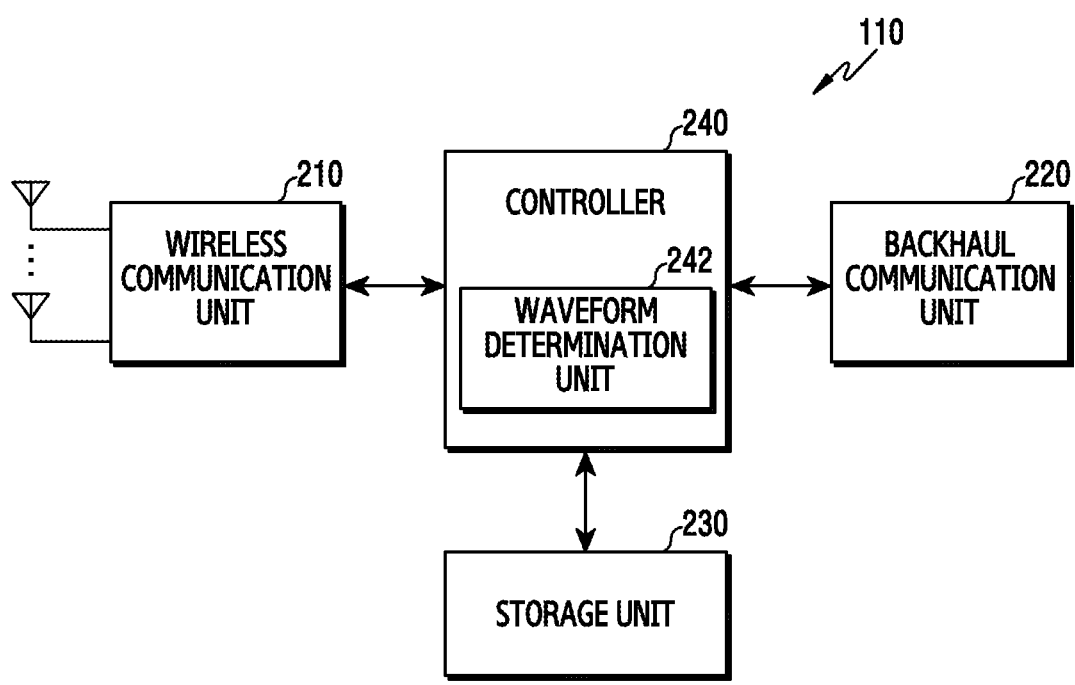
FIG. 2 illustrates a base station in a wireless communication system according to an embodiment of the disclosure.

FIG. 2 illustrates a base station in a wireless communication system according to an embodiment of the disclosure.

FIG. 2 depicts a configuration of the base station 110. A term such as 'portion' or '~er' indicates a unit for processing at least one function or operation, and may be implemented using hardware, software, or a combination of hardware and software.

Referring to FIG. 2, the base station 110 includes a wireless communication unit 210, a backhaul communication unit 220, a storage unit 230, and a controller 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal. Further, the wireless communication unit 210 may receive a signal of at least two waveforms. For example, the wireless communication unit 210 may process a receive signal of a cyclic prefix (CP)-orthogonal frequency division multiplexing (OFDM) waveform and a receive signal of a discrete fourier transform (DFT)-spread (s)-OFDM waveform. To receive signals of different waveforms, the wireless communication unit 210 may perform different signal processing operations (e.g., inverse DFT (IDFT)) and different channel estimation methods. Also, the wireless communication unit 210 up-converts the baseband signal to a radio frequency (RF) band signal, transmits it via an antenna, and down-converts an RF band signal received via an antenna to a baseband signal.

For doing so, the wireless communication unit 210 may include a transmit filter, a receive filter, an amplifier, a mixer, an oscillator, a digital to analog convertor (DAC), an analog to digital convertor (ADC), and the like. Also, the wireless communication unit 210 may include a plurality of transmit and receive paths. Further, the wireless communication unit 210 may include at least one antenna array including a plurality of antenna elements. In terms of hardware, the wireless communication unit 210 may include a digital circuit and an analog circuit, and the analog unit may include a plurality of sub-units according to an operating power and an operating frequency.

As such, the wireless communication unit 210 transmits and receives the signals. Hence, whole or part of the wireless communication unit 210 may be referred to as a transmitter, a receiver, or a transceiver. Hereafter, the transmission and the reception over the wireless channel embrace the above-stated processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores a basic program for operating the base station 110, an application program, and data such as setting information. The storage unit 230 may include a volatile memory, a non-volatile memory, or a combination of a volatile memory and a non-volatile memory. The storage unit 230 provides the stored data in response to a request of the controller 240.

The controller 240 controls general operations of the base station 110. For example, the controller 240 sends and receives signals through the wireless communication unit 210 or the backhaul communication unit 220. Also, the controller 240 records and reads data in and from the storage unit 230. The controller 240 may execute functions of a protocol stack requested by a communication standard. For doing so, the controller 240 may include at least one processor.

According to various embodiments, the controller 240 may include a waveform determination unit 242 which determines a waveform of an uplink signal. For example, the waveform determination unit 242 may determine the waveform based on at least one of a cell environment of the base station, a system parameter, a channel of the terminal, and a feedback from the terminal. Herein, the determined waveform may be applied to a signal for initial access of the terminal. Herein, the waveform determination unit 242 may be, as an instruction set or code stored in the storage unit 230, a storage space storing the instructions/code resided in the controller 240 at least temporarily, or part of a circuitry of the controller 240. For example, the controller 240 may control the base station 110 to carry out operations according to various embodiments.

Figure 3:
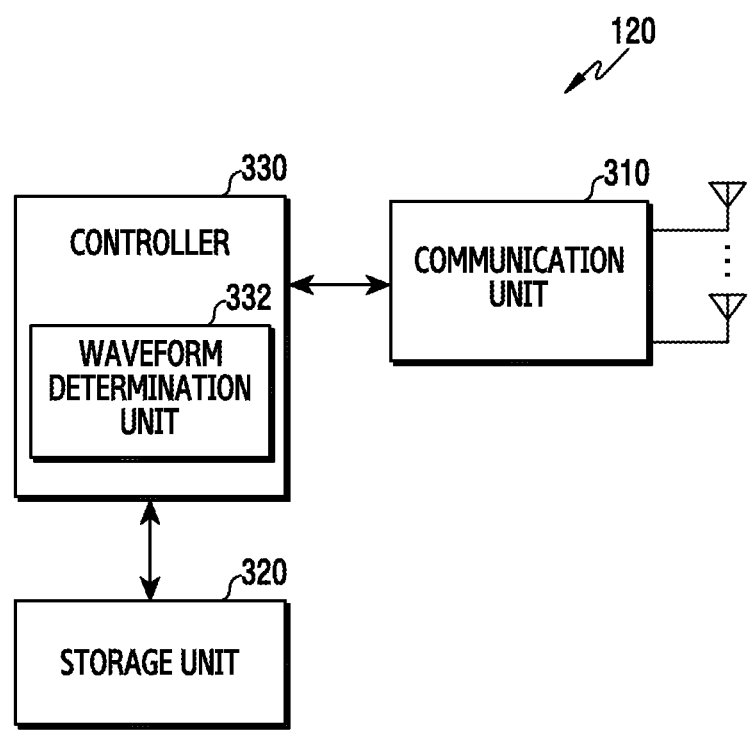
FIG. 3 illustrates a terminal in a wireless communication system according to an embodiment of the disclosure.

FIG. 3 illustrates a terminal in a wireless communication system according to an embodiment of the disclosure.

FIG. 3 depicts a configuration of the terminal 120. A term such as 'portion' or '~er' indicates a unit for processing at least one function or operation, and may be implemented using hardware, software, or a combination of hardware and software.

Referring to FIG. 3, the terminal 120 includes a communication unit 310, a storage unit 320, and a controller 330.

The communication unit 310 may transmit and receive signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Further, the communication unit 310 may generate signals of at least two waveforms. For example, the communication unit 310 may generate a signal of a CP-OFDM waveform and a signal of a DFT-s-OFDM waveform. To generate signals of different waveforms, the communication unit 310 may perform different signal processing operations (e.g., DFT operation) and different signal mapping methods. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

As such, the communication unit 310 transmits and receives the signals. Hence, whole or part of the communication unit 310 may be referred to as a transmitter, a receiver, or a transceiver. Hereafter, the transmission and the reception over the radio channel embrace the above-stated processing of the communication unit 310.

The storage unit 320 stores a basic program for operating the terminal 120, an application program, and data such as setting information. The storage unit 320 may include a volatile memory, a non-volatile memory, or a combination of a volatile memory and a non-volatile memory. The storage unit 320 provides the stored data according to a request of the controller 330.

The controller 330 controls general operations of the terminal 120. For example, the controller 330 transmits and receives signals through the communication unit 310. Also, the controller 330 records and reads data in and from the storage unit 320. The controller 330 may execute functions of a protocol stack required by a communication standard. For doing so, the controller 330 may include at least one processor or microprocessor, or may be part of a processor. Part of the communication unit 310 and the controller 330 may be referred to as a communication processor (CP).

According to various embodiments, the controller 330 may include a waveform determination unit 332 which determines a waveform of an uplink signal. For example, the waveform determination unit 332 may determine the waveform based on at least one of a cell environment of a base station, a system parameter, a channel of the terminal, and an indication from the base station. Herein, the determined waveform may be applied to a signal for initial access of the terminal. Herein, the waveform determination unit 332 may be, as an instruction set or code stored in the storage unit 320, a storage space storing the instructions/code resided in the controller 330 at least temporarily, or a part of a circuitry of the controller 330. For example, the controller 330 may control the terminal to carry out operations according to various embodiments.

Figure 4:
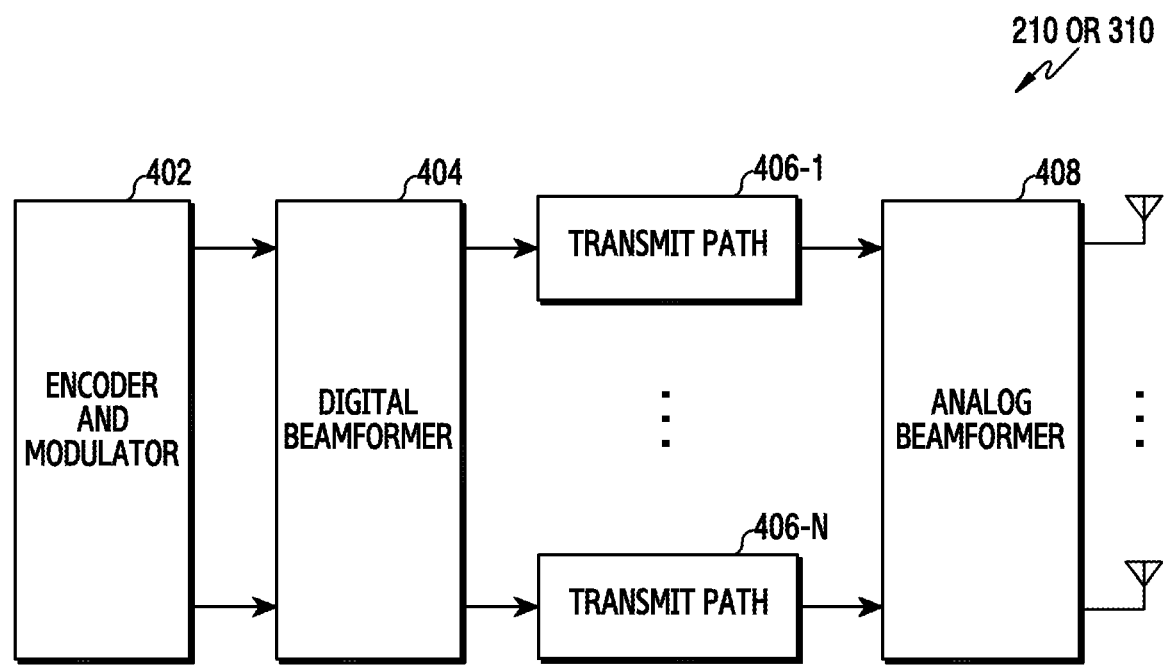
FIG. 4 illustrates a communication unit in a wireless communication system according to an embodiment of the disclosure.

FIG. 4 illustrates a communication unit in a wireless communication system according to an embodiment of the disclosure.

FIG. 4 depicts a detailed configuration of the wireless communication unit 210 of FIG. 2 or the communication unit 310 of FIG. 3. More specifically, FIG. 4 depicts components, as part of the wireless communication unit 210 of FIG. 2 or the communication unit 310 of FIG. 3, for performing the beamforming.

Referring to FIG. 4, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to change a level and a phase of a signal and may be referred to as a precoding matrix or a precoder. The digital beamformer 404 outputs the digital-beamformed modulation symbols to the plurality of transmit paths 406-1 through 406-N. In so doing, according to multiple input multiple output (MIMO) transmission, the modulation symbols may be multiplexed or the same modulation symbols may be fed to the plurality of transmit paths 406-1 through 406-N.

The plurality of transmit paths 406-1 through 406-N convert the digital-beamformed digital signals to analog signals. For doing, the plurality of transmit paths 406-1 through 406-N each may include an inverse fast fourier transform (IFFT) operator, a CP adder, a DAC, and an up-converter. The CP adder is used for the OFDM and may be excluded when another physical layer scheme (e.g., filter bank multi-carrier (FBMC)) is applied. To support the DFT-s-OFDM waveform, the plurality of transmit paths 406-1 through 406-N each may further include a DFT processor. That is, the plurality of transmit paths 406-1 through 406-N provide an independent signal process for a plurality of streams generated through the digital beamforming. Notably, depending on the implementation, some of the components of the plurality of transmit paths 406-1 through 406-N may be used in common.

The analog beamformer 408 beamforms the analog signals. For doing so, the analog beamformer 408 multiplies the analog signals by the beamforming weights. Herein, the beamforming weights are used to change the level and the phase of the signal.

To use a service from the base station 110, the terminal 120 needs to access the base station 110.

Figure 5:
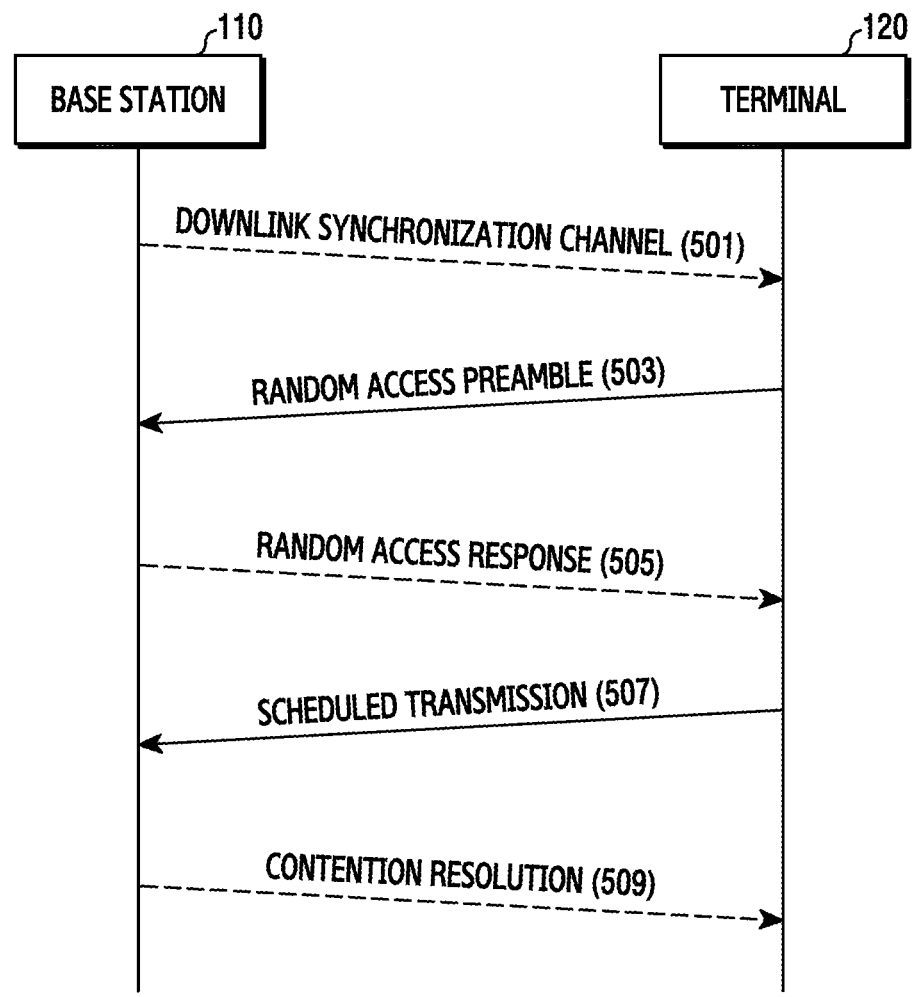
FIG. 5 illustrates an initial access procedure in a wireless communication system according to an embodiment of the disclosure.

FIG. 5 illustrates a random access procedure. FIG. 5 depicts the initial access procedure in a wireless communication system according to various embodiments of the disclosure.

Referring to FIG. 5, in operation 501, the terminal 120 receives a synchronization signal from the base station 110. At the initial access, since the base station 110 cannot identify the terminal 120, the terminal 120 attempts to access a network through power-on or handover acquires downlink synchronization based on a downlink synchronization signal.

In operation 503, the terminal 120 transmits a random access preamble to the base station 110. The terminal 120 may obtain RACH configuration information regarding a downlink broadcast signal (e.g., MIB, SIB) transmitted over a broadcast channel (BCH). Herein, the RACH may be referred to as a physical RACH (PRACH). Based on the RACH configuration, the terminal 120 may select any one random access (RA) sequence and transmit a random access preamble based on the selected RA sequence. Hereafter, the random access preamble may be referred to as an MSG1.

In operation 505, the base station 110 transmits a random access response (RAR) to the terminal 120. That is, the base station 110 may detect the RACH transmission from the terminal 120 and sends resource allocation information for uplink transmission. That is, the random access response may include a grant for the uplink transmission. Hereafter, the random access response may be referred to as an MSG2. In response to no response from the base station 110 during a given time after the random access preamble is transmitted, the terminal 120 may determine transmission failure and conduct retransmission.

In operation 507, the terminal 120 performs scheduled transmission to the base station 110. Uplink data transmitted through the scheduled transmission includes an identifier (ID) of the terminal 120 and a radio resource control (RRC) connection message. Herein, the uplink data transmitted in operation 507 may be referred to as an MSG3.

In operation 509, the base station 110 sends a contention resolution message to the terminal 120. That is, the base station 110 receiving the MSG3 may perform the contention resolution by transmitting RRC setup information through downlink data. In a non-contention based random access such as handover, only operations regarding the MSG1 and the MSG2 of FIG. 5 may be performed.

In the random access procedure of FIG. 5, the MSG1 and the MSG3 are uplink signals transmitted before the terminal 120 enters a connected mode. Coverage of the MSG1 and the MSG3 depends on a waveform. Available waveforms include CP-OFDM and DFT-s-OFDM. Since the waveform determines a peak to average power ratio (PAPR), coverage expected may also differ. Since the MSG1 is based on the sequence, the DFT-s-OFDM may be advantageous to coverage expansion according to a sequence type used for the MSG1, or the coverage may be identical regardless of the waveform. However, since the MSG3 is not based on the sequence, that is, since the MSG3 is transmitted over an uplink data channel (e.g., physical uplink shared channel (PUSCH)), it is expected that the coverage differs depending on the waveform.

The CP-OFDM may be considered as a default uplink waveform of the connected mode. However, the DFT-s-OFDM may be supported, in consideration of a link-budget limited situation. Hence, the base station 110 may determine and notify setting for the waveform to the terminal 120. However, before the terminal 120 accesses the base station 110, the base station 110 cannot know the situation of the terminal 120. In this case, the base station 110 cannot inform the terminal 120 of the MSG3 waveform.

The following two cases may be considered as the waveform for the uplink transmission before the connected mode, that is, in an idle mode. The first case may use a single waveform, and the second case may use a dual waveform.

For the single waveform for the uplink transmission, the CP-OFDM and the DFT-s-OFDM may be used individually.

Figure 6:
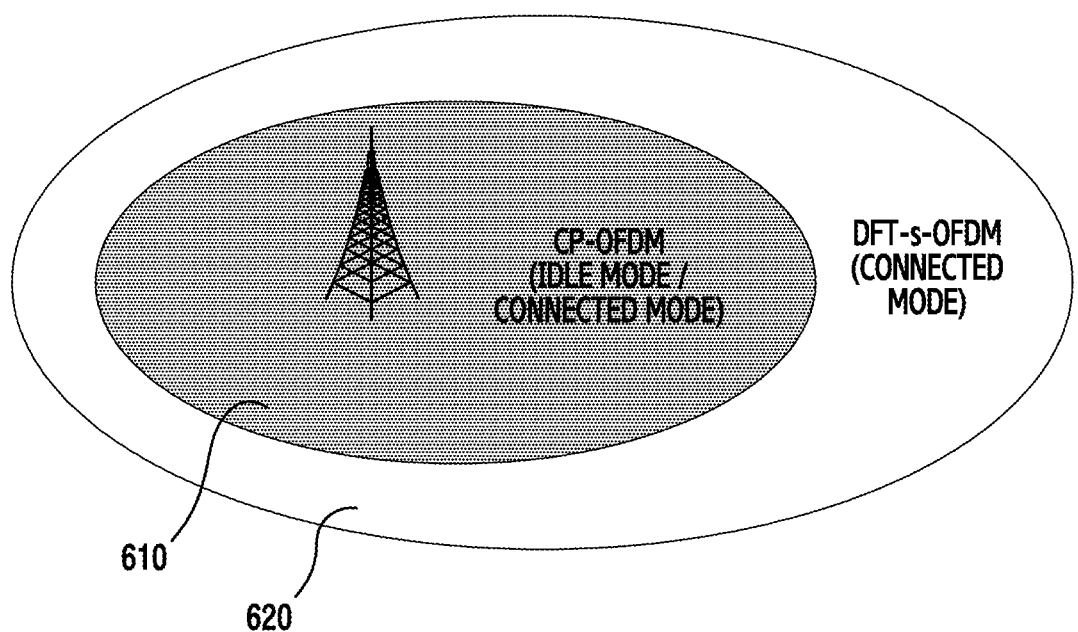
FIG. 6 illustrates coverage change based on an uplink signal waveform in a wireless communication system according to an embodiment of the disclosure.

The CP-OFDM waveform is used to transmit the MSG3, and accordingly coverage of the MSG3 may be smaller than PUSCH coverage of the connected mode as shown in FIG. 6.

FIG. 6 depicts coverage change based on an uplink signal waveform in a wireless communication system according to an embodiment of the disclosure.

Referring to FIG. 6, with respect to the PUSCH of the connected mode, the base station 110 may apply the DFT-s-OFDM to the terminal 120 for the sake of the coverage expansion and accordingly coverage 620 based on the DFT-s-OFDM may be greater than coverage 610 of the MSG3 based on the CP-OFDM.

The DFT-s-OFDM may be used for the MSG3 transmission. As mentioned earlier, the DFT-s-OFDM may achieve relatively larger coverage than the CP-OFDM used for the MSG3 transmission. However, limitations may be caused by the operational difference of the DFT-s-OFDM waveform and the CP-OFDM waveform. For example, limitations may occur due to a structure of a demodulation reference signal (DMRS).

Figure 7:
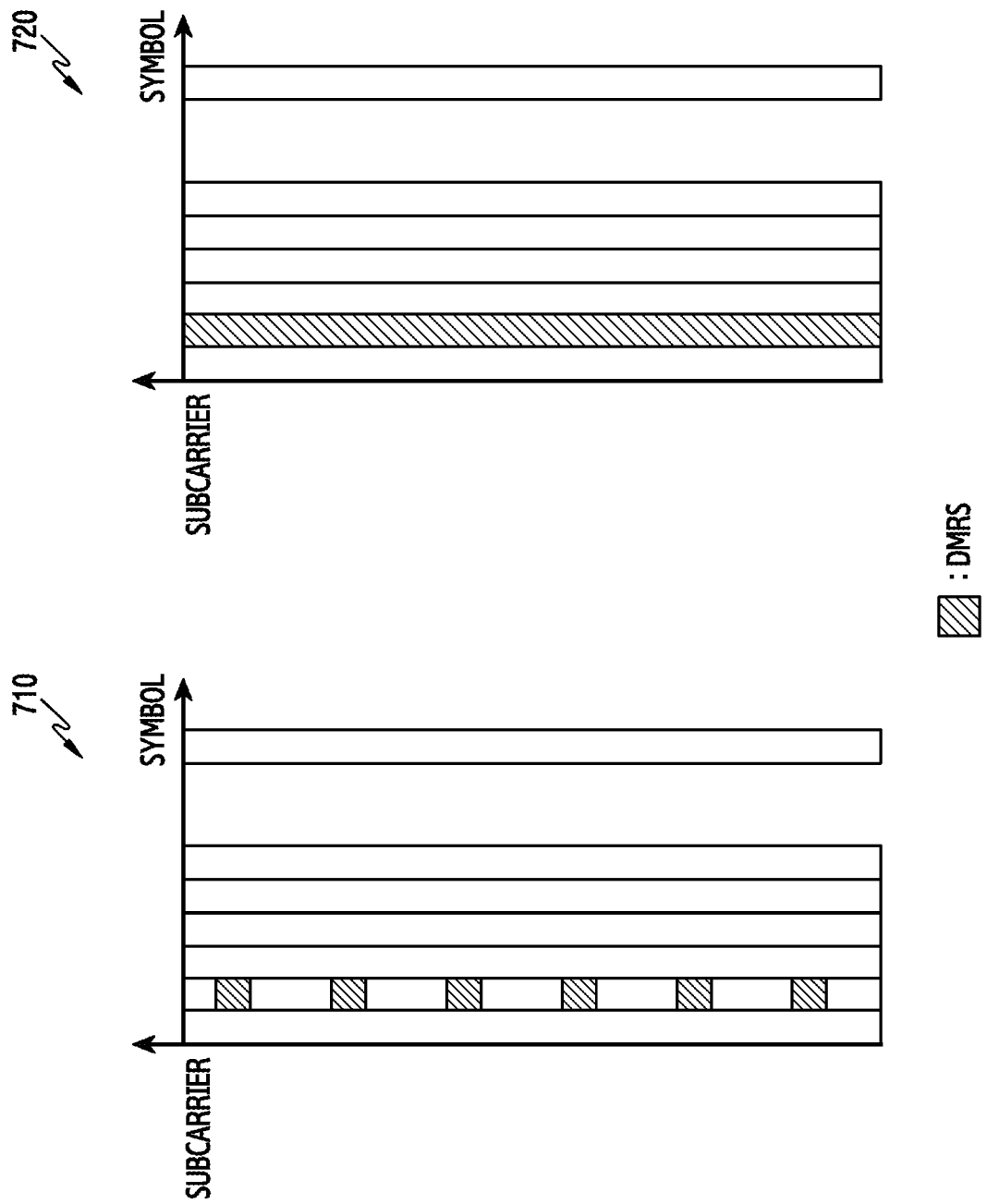
FIG. 7 illustrates difference of a reference signal structure based on a signal waveform in a wireless communication system according to an embodiment of the disclosure.

FIG. 7 depicts difference of a reference signal structure based on a signal waveform in a wireless communication system according to an embodiment of the disclosure.

Referring to FIG. 7, in a structure 710 using the CP-OFDM, the DMRS may be allocated on a resource element (RE) basis. By contrast, in a structure 720 using the DFT-s-OFDM, the entire symbol is used as the DMRS to maintain a low PAPR.

As shown in FIG. 7, dynamic TDD operation may be limited because the structure of the DMRS differs according to the waveform. For example, according to the dynamic TDD, an uplink interval and a downlink interval of different cells may overlap in a time axis, thus causing mutual interference. When the CP-OFDM is applied to the downlink of one cell and the DFT-s-OFDM is applied to the uplink of another cell, it may be difficult to use interference cancellation due to the structural difference of the DMRS. That is, since it is required to apply the same waveforms to the downlink and the uplink in order to efficiently operate the dynamic TDD, the MSG3 waveform fixed to the DFT-s-OFDM may cause limitations in the dynamic TDD operation.

Thus, the following explanations provide various embodiments for obtaining the coverage by applying the DFT-s-OFDM and efficiently operating the dynamic TDD by applying the same CP-OFDM to the downlink and the uplink of neighboring cells.

Figure 8:
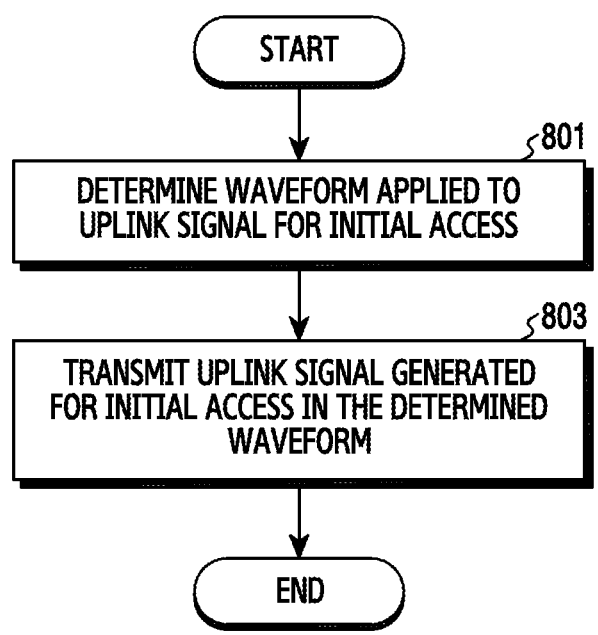
FIG. 8 illustrates an operating method of a terminal in a wireless communication system according to an embodiment of the disclosure.

FIG. 8 illustrates an operating method of a terminal in a wireless communication system according to an embodiment of the disclosure. FIG. 8 illustrates the operating method of the terminal 120.

Referring to FIG. 8, in operation 801, the terminal determines a waveform applied to an uplink signal for initial access. Herein, the uplink signal for the initial access may use either a random access preamble (e.g., MSG1) or a message (e.g., MSG3) transmitted over a resource allocated in response to the random access preamble. That is, the terminal determines the waveform to apply to a signal transmitted before the connected mode, that is, in the idle mode. For example, the terminal may determine the waveform based on at least one of a cell environment of the base station, a system parameter, a channel of the terminal, and an indication from the base station.

In operation 803, the terminal transmits at least one uplink signal which is generated based on the determined waveform for the initial access. For example, the terminal may apply the waveform determined when transmitting the random access preamble. Alternatively, the terminal may apply the waveform determined when transmitting the MSG3. Alternatively, when both of the MSG1 waveform and the MSG3 waveform are determined in operation 801, the terminal may apply the waveforms to signals respectively. An operational procedure (e.g., DFT operation, signal mapping) for generating the signal may differ according to the applied waveform.

Figure 9:
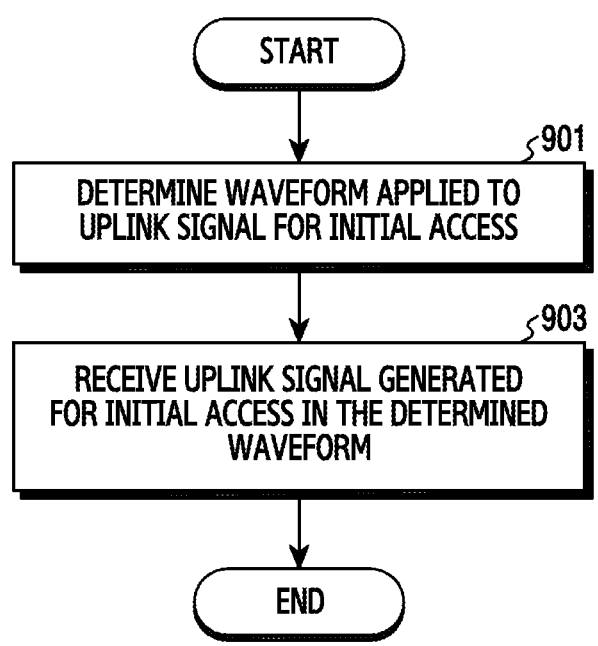
FIG. 9 illustrates an operating method of a base station in a wireless communication system according to an embodiment of the disclosure.

FIG. 9 illustrates an operating method of a base station in a wireless communication system according to an embodiment of the disclosure. FIG. 9 illustrates the operating method of the base station 110.

Referring to FIG. 9, in operation 901, the base station determines a waveform applied to an uplink signal for initial access. Herein, the uplink signal for the initial access may use either a random access preamble (e.g., MSG1) or a message (e.g., MSG3) transmitted over a resource allocated in response to the random access preamble. That is, the base station determines the waveform to apply to a signal transmitted from the terminal before the connected mode, that is, in the idle mode. For example, the base station 110 may determine the waveform based on at least one of a cell environment of the base station, a system parameter, a channel of the terminal, and a feedback from the terminal.

In operation 903, the base station receives at least one uplink signal which is generated based on the determined waveform for the initial access. For example, the base station may receive the random access preamble generated in the determined waveform. Alternatively, the base station may receive the MSG3 generated in the determined waveform. Alternatively, when both of the MSG1 waveform and the MSG3 waveform are determined in operation 901, the base station may receive signals generated in the respective waveforms. The base station processes the received signal according to the determined waveform. An operational procedure (e.g., channel estimation scheme, IDFT operation) for processing the signal may differ according to the applied waveform.

As shown in FIGS. 8 and 9, the waveform applied to the uplink transmission in the initial access, that is, in the idle mode may be adaptively determined. Thus, the dynamic TDD may be operated efficiently and larger coverage may be obtained. Now, specific embodiments for determining the waveform are described.

First, embodiments regarding the dual waveform, wherein two or more waveforms are supported in a single cell, are explained.

Figure 10:
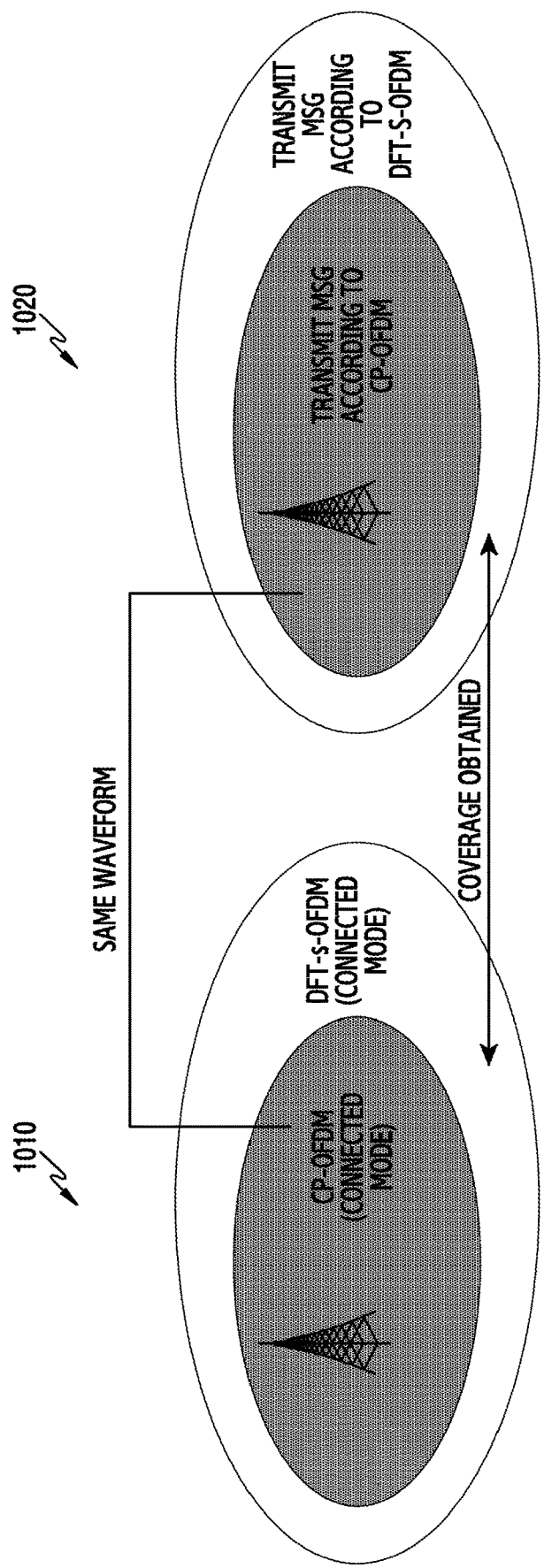
FIG. 10 illustrates a dual waveform applied to an uplink signal in a wireless communication system according to an embodiment of the disclosure.

The dual waveform may be applied to the transmission of the MSG3, and a condition of using the dual waveform may be defined as shown in FIG. 10.

FIG. 10 depicts a dual waveform applied to an uplink signal in a wireless communication system according to an embodiment of the disclosure.

Referring to FIG. 10, when the terminal operates in the connected mode 1010 and when the terminal transmits the MSG3 1020, the terminal transmitting the MSG3 may apply the same CP-OFDM as the physical downlink shared channel (PDSCH) near a cell center and apply the DFT-s-OFDM on a cell boundary for the sake of coverage expansion.

Methods for selecting and applying, as the waveform of the MSG3, one of the DFT-s-OFDM and the CP-OFDM may be divided into a method for applying the waveform through implicit indication and a method for applying the waveform through explicit indication.

Figure 11:
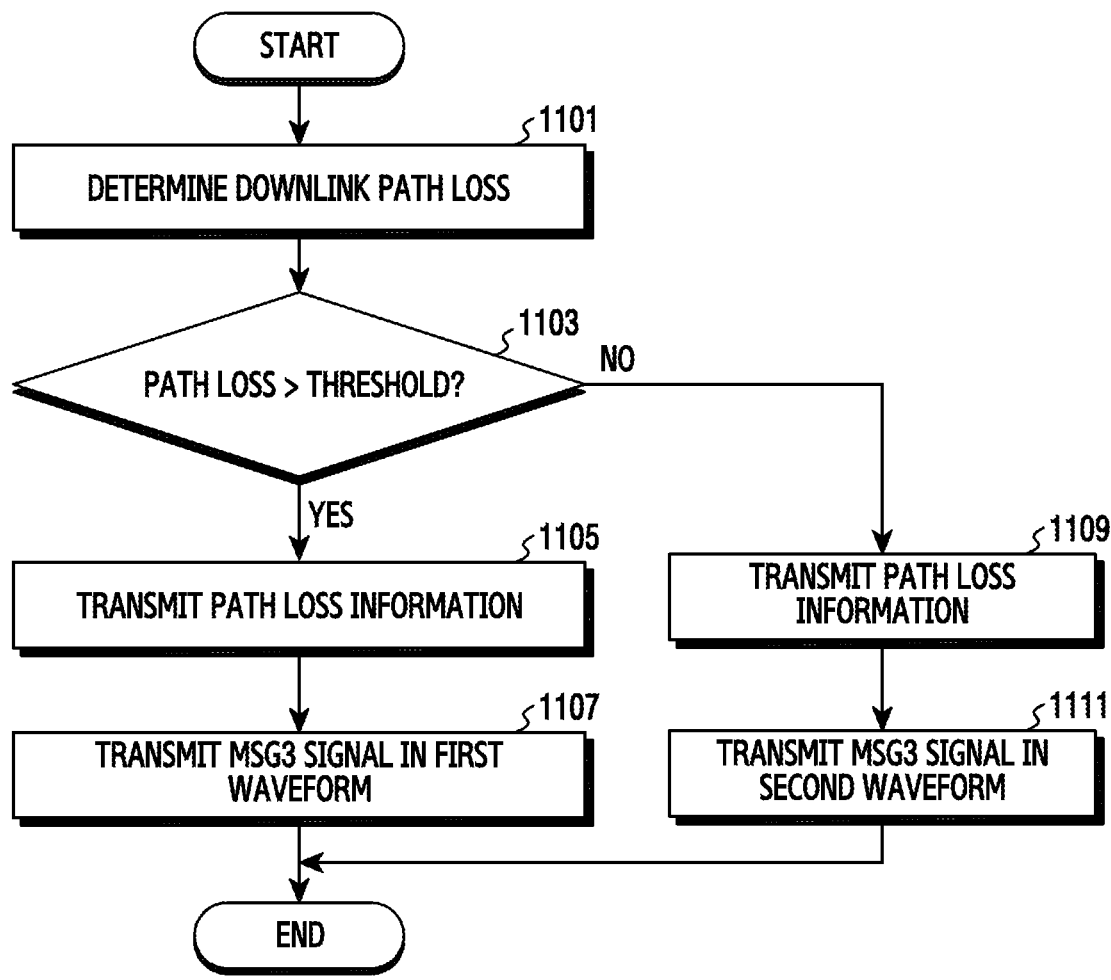
FIG. 11 illustrates an operating method of a terminal for determining and reporting a waveform for a message-3 (MSG3) in a wireless communication system according to an embodiment of the disclosure.

In a first method for selectively applying the DFT-s-OFDM and the CP-OFDM to the MSG 3, the terminal determines the waveform of the MSG3 and reports the waveform to the base station. FIG. 11 depicts an embodiment where the terminal determines and reports an uplink waveform to the base station.

FIG. 11 illustrates an operating method of a terminal for determining and reporting a waveform for an MSG3 in a wireless communication system according to an embodiment of the disclosure.

Referring to FIG. 11, in operation 1101, the terminal determines a downlink path loss. For example, the terminal may calculate the path loss between the base station and the terminal using a downlink synchronization signal and a reference signal. Based on the path loss, it is possible to roughly estimate a status of the terminal, that is, whether a channel quality (e.g., receive signal-to-noise ratio (SNR)) is good within the cell or bad on the cell boundary. Hence, an adequate waveform for the status of the terminal may be determined.

In operation 1103, the terminal determines whether the path loss is greater than a threshold. Herein, the threshold may be defined variously according to a specific embodiment. For example, the threshold may be pre-defined. For example, the threshold may be received from the base station. For example, the threshold may be obtained from other information.

When the path loss exceeds the threshold, the terminal transmits path loss information to the base station in operation 1105. The terminal may determine the waveform of the MSG3 based on its status information based on the path loss, and report the status information to the base station. In operation 1107, the terminal transmits an MSG3 signal according to a first waveform. Herein, the first waveform may be the DFT-s-OFDM.

By contrast, when the path loss is smaller than or equal to the threshold, the terminal transmits path loss information to the base station in operation 1109. The terminal may determine the waveform of the MSG3 based on its status information based on the path loss, and report the status information to the base station. In operation 1111, the terminal transmits an MSG3 signal according to a second waveform. Herein, the second waveform may be the CP-OFDM.

In FIG. 11, the terminal status information based on the path loss may be delivered by reporting a path loss value or transmitting a 1-bit indicator according to the path loss value. A measured path loss value is reported to the base station. The base station and the terminal may agree a particular path loss value in advance, regard the cell boundary when the path loss value exceeds a given value, and agree to transmit the MSG3 using the DFT-s-OFDM waveform. The base station and the terminal may regard the location inside the cell when the path loss value falls below the given value, and agree to use the CP-OFDM waveform so as to efficiently operate the dynamic TDD. Transmitting the 1-bit indicator includes quantizing the path loss value to a 1-bit based on the threshold. According to the 1-bit quantization, the terminal may regard the location on the cell boundary when the path loss value exceeds the given value, report 1-bit information having a first value (e.g., '1') to the base station, and transmit the MSG3 using the DFT-s-OFDM waveform. The terminal may regard the location inside the cell when the path loss value falls below the given value and agree to report 1-bit information having a second value (e.g., '0') to the base station and to use the CP-OFDM waveform so as to efficiently operate the dynamic TDD. The 1-bit indicator value may be set vice versa.

In FIG. 11, the terminal transmits the path loss information to the base station. According to an embodiment, the path loss information may be delivered by a random access preamble. For example, sequences for the random access preamble may be divided into two or more sets, and each set may correspond to a particular path loss value. For example, when the sequences are divided into two sets, the path loss value quantized to one bit may be transmitted. According to another embodiment, the path loss information may be transmitted together with the random access preamble. In this case, a signal indicating the path loss information may be generated by a predefined modulation and coding scheme (MCS) and mapped to a resource adjacent to the random access preamble. According to yet another embodiment, the path loss information may be transmitted using on/off keying based on energy detection. In this case, at least one RE for the path loss information may be allocated in advance. Besides, the path loss information may be transmitted in other manners.

In a second method for selectively applying the DFT-s-OFDM and the CP-OFDM to the MSG3, the base station determines the waveform for the MSG3 based on the value reported by the terminal, and notifies a result to the terminal. In this regard, operations of the base station and the terminal are described by referring to FIG. 12A and FIG. 12B.

Figure 12A:
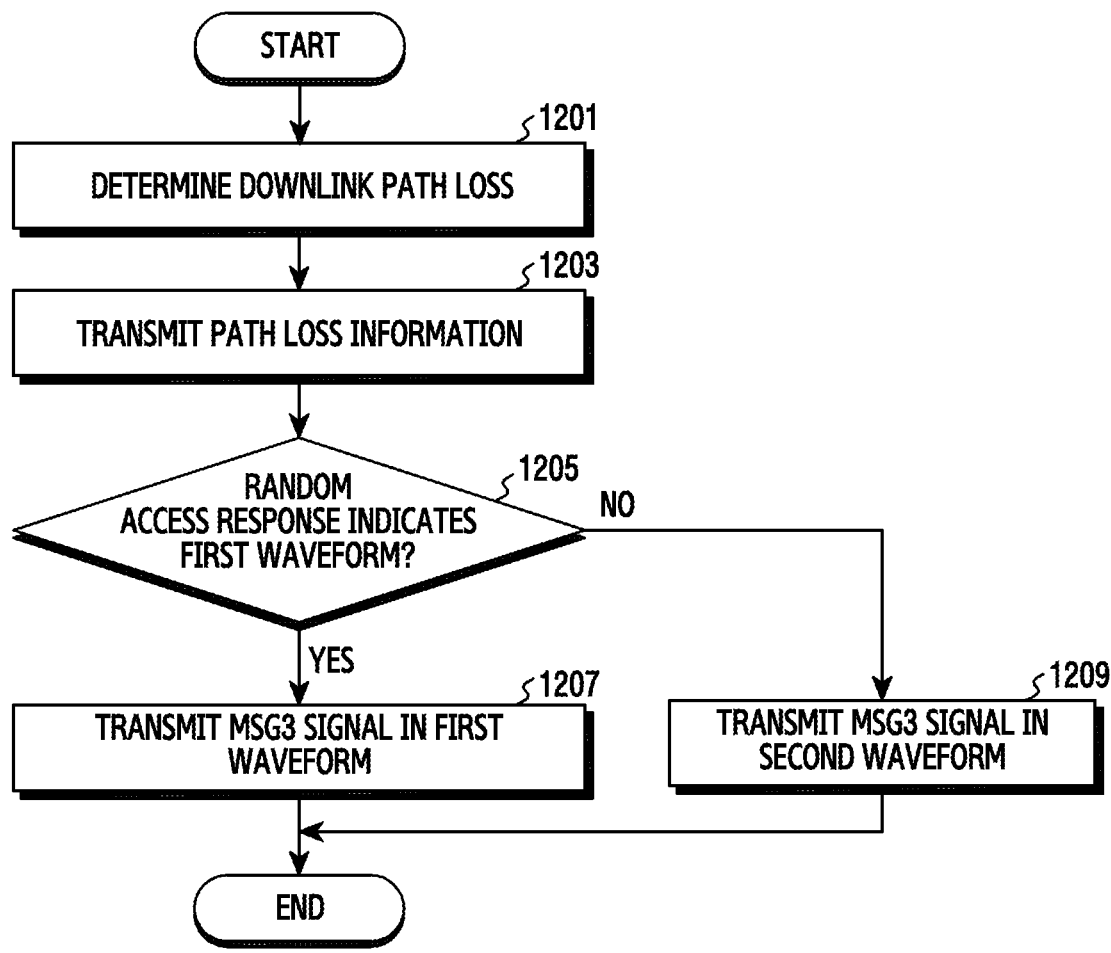
FIG. 12A illustrates an operating method of a terminal for determining a waveform for an MSG3 based on report of the terminal in a wireless communication system according to an embodiment of the disclosure.

FIG. 12A illustrates an operating method of a terminal for determining a waveform for an MSG3 based on report of the terminal in a wireless communication system according to an embodiment of the disclosure. FIG. 12A illustrates the operating method of the terminal 120.

Referring to FIG. 12A, in operation 1201, the terminal determines a downlink path loss. For example, the terminal may calculate the path loss between the base station and the terminal using a downlink synchronization signal and a reference signal. Based on the path loss, it is possible to roughly estimate a status of the terminal, that his, whether a channel quality (e.g., receive SNR) is good within a cell or bad on a cell boundary.

In operation 1203, the terminal transmits pass loss information to the base station. The path loss information may include a path loss value, or quantization information regarding the path loss value based on a threshold. According to various embodiments, the path loss information may be delivered by sequence selection of a random access preamble, by a signal assigned to the random access preamble, or by on-off keying using a separate RE.

In operation 1205, the terminal determines whether a first waveform is indicated, based on a random access response. That is, the terminal may receive the random access response (e.g., MSG2) and identify information indicating the waveform in the random access response.

When the first waveform is indicated, the terminal transmits an MSG3 signal according to the first waveform, in operation 1207. Herein, the first waveform may be the DFT-s-OFDM. By contrast, when the first waveform is not indicated, that is, when a second waveform is indicated, the terminal transmits an MSG3 signal according to the second waveform, in operation 1209. Herein, the second waveform may be the CP-OFDM.

Figure 12B:
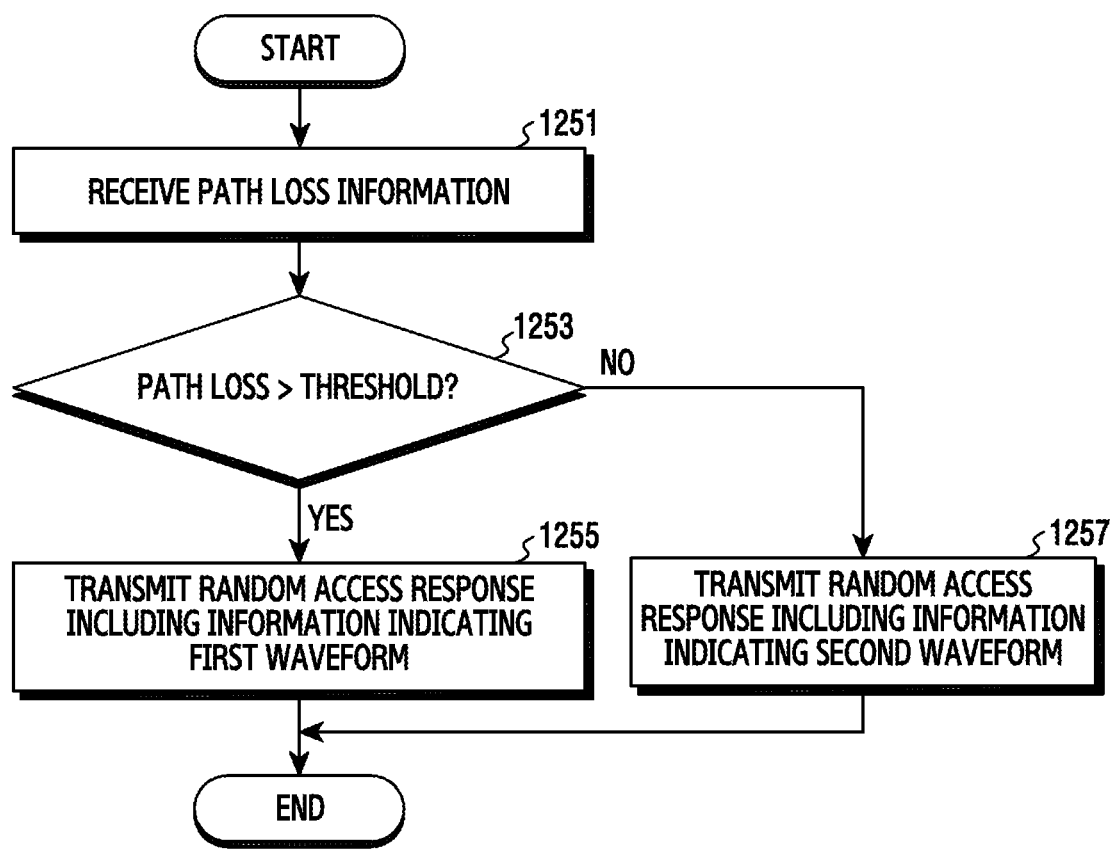
FIG. 12B illustrates an operating method of a base station for determining a waveform for an MSG3 based on report of a terminal in a wireless communication system according to an embodiment of the disclosure.

FIG. 12B illustrates an operating method of a base station for determining a waveform for an MSG3 based on report of a terminal in a wireless communication system according to an embodiment of the disclosure. FIG. 12B illustrates the operating method of the base station 110.

Referring to FIG. 12B, in operation 1251, the base station receives path loss information. The path loss information may include a path loss value, or quantization information regarding the path loss value based on a threshold. According to various embodiments, the path loss information may be delivered by sequence selection of a random access preamble, by a signal assigned to the random access preamble, or by on-off keying using a separate RE.

In operation 1253, the base station determines whether the path loss is greater than a threshold. That is, the base station may determine which waveform is adequate for a terminal status determined based on the path loss information. In operation 1253, the base station may compare a path loss value of the path loss information with the threshold, or identify a comparison result of the path loss value and the threshold based on quantized information regarding the path loss information.

When the path loss exceeds the threshold, the base station transmits a random access response including information indicative of a first waveform, in operation 1255. That is, the base station may regard the terminal on a cell boundary, and direct to set the MSG3 waveform to the DFT-s-OFDM through the random access response (e.g., MSG2).

By contrast, when the path loss is smaller than or equal to the threshold, the base station transmits a random access response including information indicative of a second waveform, in operation 1257. That is, when the path loss value falls below a specific value, the base station may regard the terminal inside the cell, and direct to set the MSG3 waveform to the CP-OFDM through the random access response in order to efficiently operate the dynamic TDD.

According to the above-stated embodiments, the terminals conducting the initial access, even in one cell, may transmit an uplink signal using different waveforms based on various statuses. According to another embodiment, the waveform of the uplink signal used for the initial access may be controlled on a cell basis, which shall be now described by referring to FIG. 13.

Figure 13:
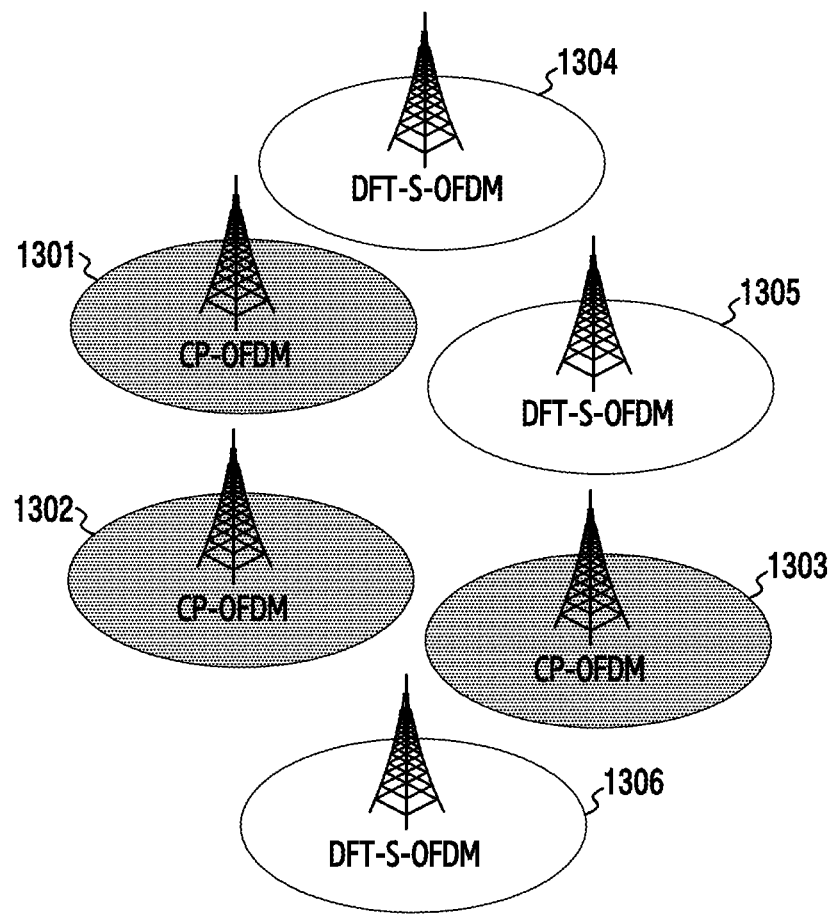
FIG. 13 illustrates a waveform selectively applied to an uplink signal in a wireless communication system according to an embodiment of the disclosure.

FIG. 13 illustrates a waveform selectively applied to an uplink signal in a wireless communication system according to an embodiment of the disclosure.

Referring to FIG. 13, among a plurality of cells, cells 1301, 1302, and 1303 use the CP-OFDM waveform for the initial access, and cells 1304, 1305, and 1306 use the DFT-s-OFDM for the initial access. Accordingly, at least some cells (e.g., the cells 1301, 1302, and 1303) may enable the effective operation of the dynamic TDD in relation to the cell which supports the CP-OFDM in the connected mode, and some cells (e.g., the cells 1304, 1305, and 1306) may provide large coverage.

In FIG. 13, cells 1301 through 1306 have the same coverage size for the sake of explanations. Cells 1301 through 1306 may have coverage in different sizes. The waveform controlled on the cell basis is described.

A third method for selectively applying the DFT-s-OFDM and the CP-OFDM to the MSG3 determines the waveform for the MSG3 transmission according to a preamble format of the transmitted MSG1. Table 1 shows preamble formats of an LTE system.

TABLE 1

| Preamble format | TCP | TSEQ |
| --- | --- | --- |
| 0 | 3168 · Ts | 24576 · Ts |
| 1 | 21024 · Ts | 24576 · Ts |
| 2 | 6240 · Ts | 2 · 24576 · Ts |
| 3 | 21024 · Ts | 2 · 24576 · Ts |
| 4 | 448 · Ts | 4096 · Ts |

As shown in Table 1, the $T_{cp}$ value and the $T_{seq}$ value change according to the preamble format. In general, preamble formats 0/2/4 may be used for a cell having cell coverage within 30 km, and preamble formats 1/3 may be used for a cell having large coverage from 77 km to 100 km. That is, the cell coverage may be estimated based on the preamble format. Hence, based on the preamble format, whether to apply the CP-OFDM or the DFT-s-OFDM as the waveform of the MSG3 may be determined.

The base station informs the terminal of the adequate preamble through RACH configuration according to its cell coverage. The terminal may predict the cell coverage based on the configured preamble format and determine the MSG3 waveform based on the cell coverage. The base station may predict which waveform is used for the MSG3, based on the configured preamble format, and perform decoding according to the predicted waveform. In this regard, operations of the base station and the terminal shall be explained by referring to FIGS. 14A, 14B, and 14C.

Figure 14A:
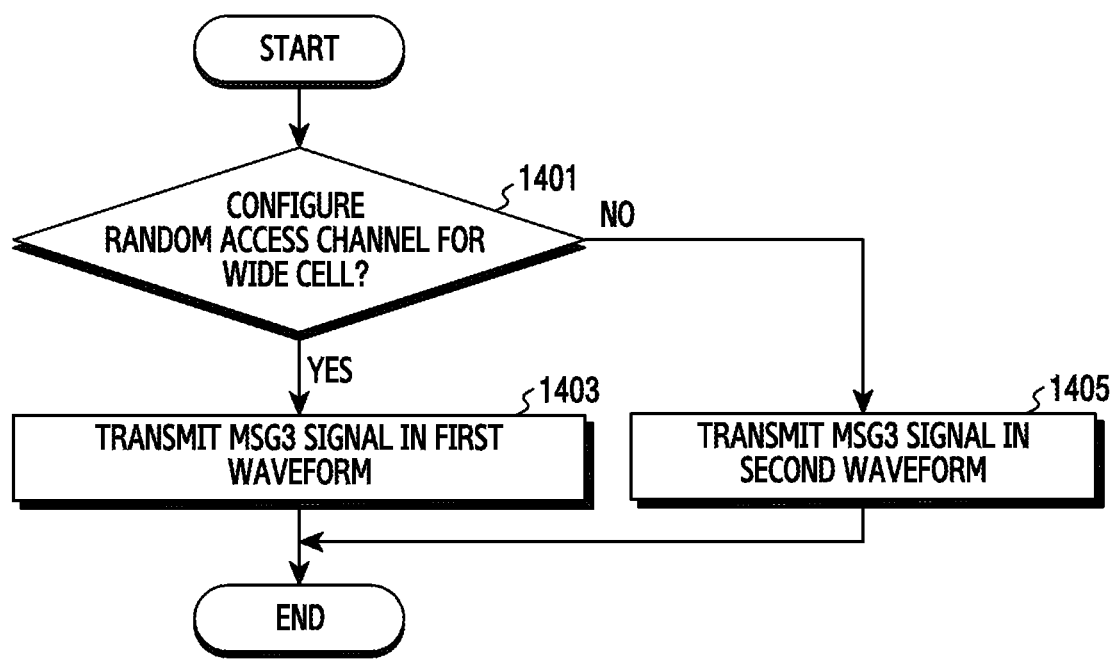
FIG. 14A illustrates an operating method of a terminal for determining a waveform for an MSG3 based on a preamble format in a wireless communication system according to an embodiment of the disclosure.

FIG. 14A illustrates an operating method of a terminal for determining a waveform for an MSG3 based on a preamble format in a wireless communication system according to an embodiment of the disclosure. FIG. 14A illustrates the operating method of the terminal 120.

Referring to FIG. 14A, in operation 1401, the terminal determines whether a random access channel for a large cell is configured. Whether the random access channel for the large cell is configured may be determined based on preamble formation information. That is, the terminal may receive system information from the base station, identify preamble format information from RACH configuration information regarding the system information, and then determine whether the random access channel for the large cell is configured.

When the random access channel for the large cell is configured, the terminal transmits an MSG3 signal according to a first waveform, in operation 1403. Herein, the first waveform may be the DFT-s-OFDM. In this case, upon identifying the preamble format 1 or 3 based on the RACH configuration information, the terminal generates and transmits the MSG3 signal according to the first waveform. For example, the terminal may generate complex symbols by modulating a message, generate a DFT-s-OFDM symbol by applying DFT and IFFT to the complex symbols, and transmit the DFT-s-OFDM symbol.

When the random access channel for the large cell is not configured, the terminal transmits an MSG3 signal according to a second waveform, in operation 1405. Herein, the second waveform may be the CP-OFDM. In this case, upon identifying the preamble format 0, 2 or 4 based on the RACH configuration information, the terminal generates and transmits the MSG3 signal according to the second waveform. For example, the terminal may generate complex symbols by modulating a message, generate a CP-OFDM symbol by applying IFFT to the complex symbols, and transmit the CP-OFDM symbol.

Figure 14B:
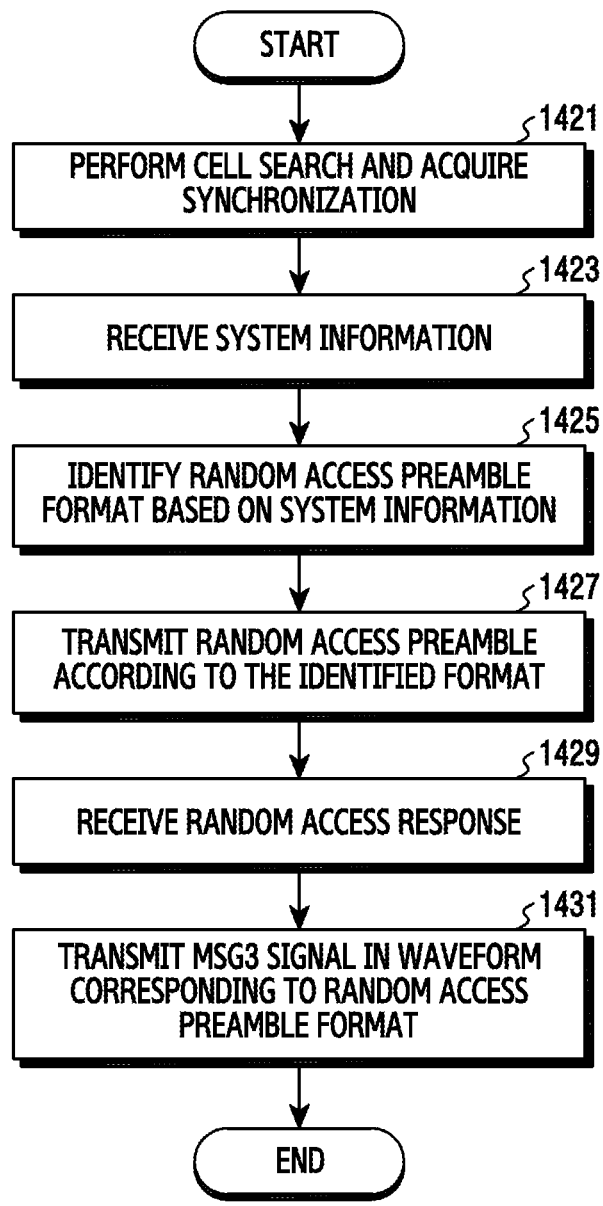
FIG. 14B illustrates another operating method of a terminal for determining a waveform for an MSG3 based on a preamble format in a wireless communication system according to an embodiment of the disclosure.

FIG. 14B illustrates another operating method of a terminal for determining a waveform for an MSG3 based on a preamble format in a wireless communication system according to an embodiment of the disclosure. FIG. 14B illustrates the operating method of the terminal 120.

Referring to FIG. 14B, in operation 1421, the terminal performs a cell search and acquires synchronization for the base station. Specifically, the terminal may determine presence of the base station through signal detection, and then acquire frame synchronization by detecting a synchronization signal.

In operation 1423, the terminal receives system information. For example, the system information may include at least one of MIB and SIB. The system information may be transmitted over a channel of a predefined location.

In operation 1425, the terminal identifies a random access preamble format based on the system information. For example, the terminal may identify a preamble format by identifying at least one control information (e.g., RACH configuration information) of the system information. For example, the preamble format may be indicated to one of the formats of Table 1.

In operation 1427, the terminal transmits a random access preamble according to the identified format. Specifically, the terminal may select one sequence allocated for the initial access among sequences defined for the random access preamble, and generates an OFDM symbol including the selected sequence in the identified format. The terminal transmits the OFDM symbol.

In operation 1429, the terminal receives a random access response. The random access response includes information about the sequence transmitted by the terminal, and information about a resource allocated to transmit the message (e.g., MSG3).

In operation 1431, the terminal transmits an MSG3 signal according to the waveform corresponding to the format of the random access preamble. For example, when the preamble format is 0, 2, or 4, the terminal may apply the CP-OFDM format. For example, when the preamble format is 1 or 3, the terminal may apply the DFT-s-OFDM format.

Figure 14C:
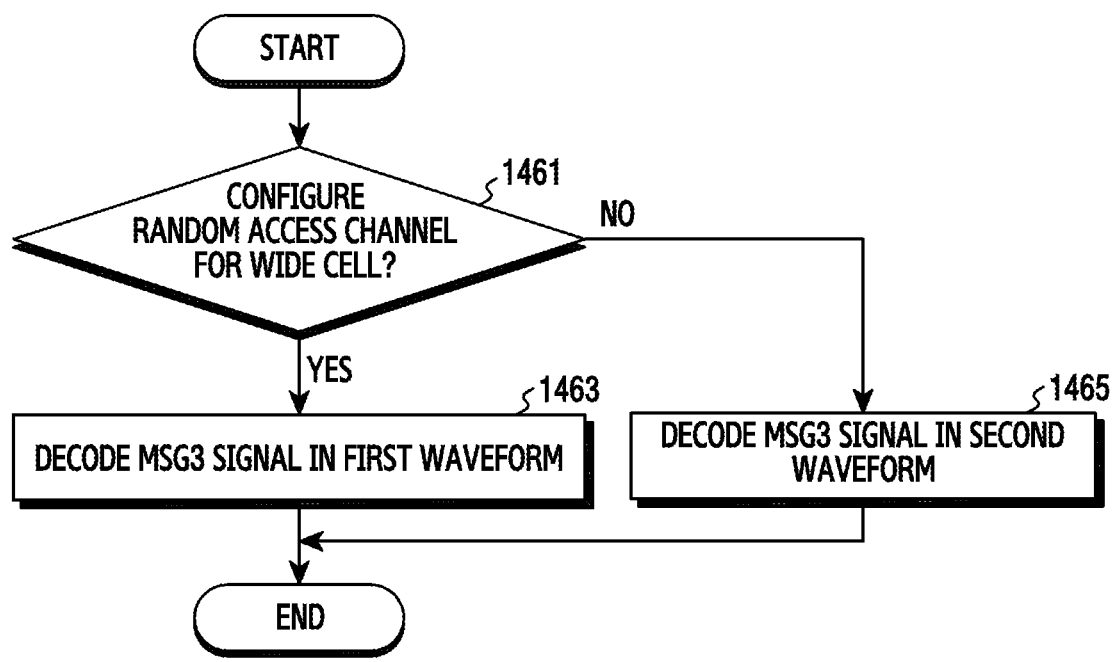
FIG. 14C illustrates an operating method of a base station for determining a waveform for an MSG3 based on a preamble format in a wireless communication system according to an embodiment of the disclosure.

FIG. 14C illustrates an operating method of a base station for determining a waveform for an MSG3 based on a preamble format in a wireless communication system according to an embodiment of the disclosure. FIG. 14C illustrates the operating method of the base station 110.

Referring to FIG. 14C, in operation 1461, the base station determines random access channel configuration for a large cell. Cell coverage of the base station may be determined when the base station is deployed. Hence, the base station may determine whether its cell is for the large coverage, based on an internal system parameter, and configure the random access channel corresponding to the coverage.

In response to the random access channel configuration for the large cell, the base station decodes an MSG3 signal according to a first waveform, in operation 1463. Herein, the first waveform may be the DFT-s-OFDM. That is, in response to the preamble format 1 or 3, the base station processes the MSG3 signal in a manner corresponding to the first waveform. For example, the base station may restore complex symbols by applying FFT and IDFT to the received signal.

In response to no random access channel configuration for the large cell, the base station decodes an MSG3 signal according to a second waveform, in operation 1465. Herein, the second waveform may be the CP-OFDM. That is, in response to the preamble format 0, 2, or 4, the base station processes the MSG3 signal in a manner corresponding to the second waveform. For example, the base station may restore complex symbols by applying FFT to the received signal.

A fourth method for selectively applying the DFT-s-OFDM and the CP-OFDM to the MSG3 applies the same waveform as the waveform used for the terminal to transmit the MSG1, to the MSG3. On various bases, the terminal may apply the DFT-s-OFDM or the CP-OFDM to the MSG1. On the same basis, the same waveform as the MSG1 may be selected for the MSG3. It may be assumed that the base station may also estimate the waveform of the MSG1 through a blind/explicit method, and receive the MSG3 by applying the corresponding waveform. In this regard, operations of the base station and the terminal shall be described by referring to FIG. 15A and FIG. 15B.

Figure 15A:
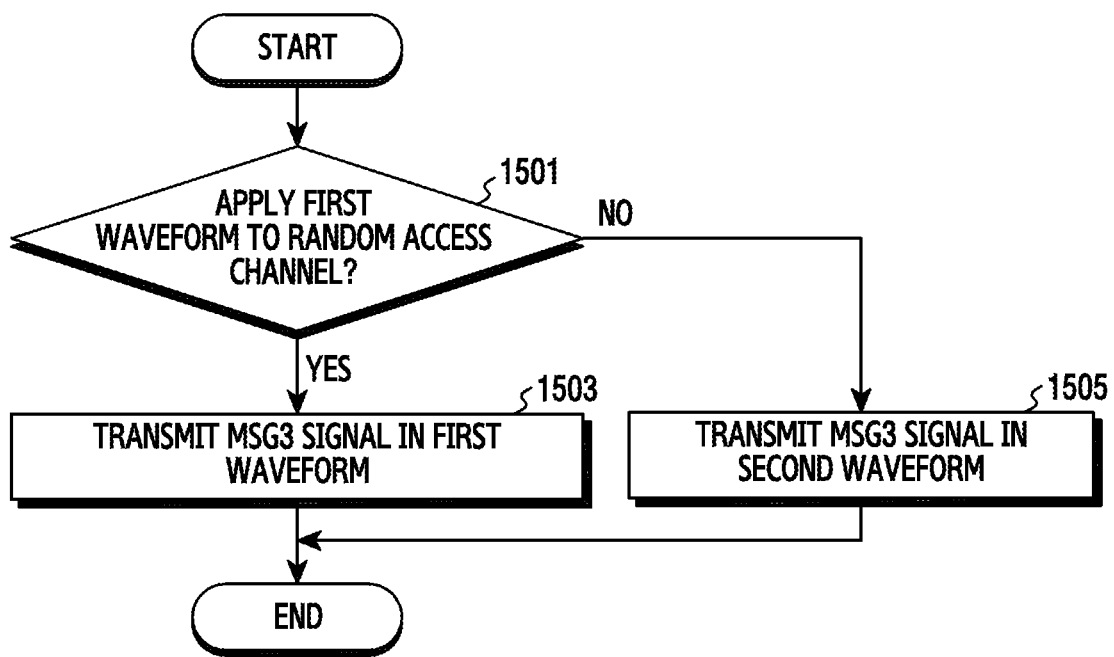
FIG. 15A illustrates an operating method of a terminal for determining a waveform for an MSG3 based on a waveform applied to a message-1 (MSG1) in a wireless communication system according to an embodiment of the disclosure.

FIG. 15A illustrates an operating method of a terminal for determining a waveform for an MSG3 based on a waveform applied to an MSG1 in a wireless communication system according to an embodiment of the disclosure. FIG. 15A illustrates the operating method of the terminal 120.

Referring to FIG. 15A, in operation 1501, the terminal determines whether a first waveform is applied to a random access channel. The terminal, which transmits a random access preamble (e.g., MSG1) over the random access channel before transmitting MSG3, may identify the waveform applied to the random access channel. For example, the waveform applied to the random access channel may be selected according to cell coverage.

In operation 1503, the terminal transmits an MSG3 signal according to the first waveform. Herein, the first waveform may be the DFT-s-OFDM. That is, the terminal generates and transmits the MSG3 signal according to the first waveform. For example, the terminal may generate complex symbols by modulating the message, generate a DFT-s-OFDM symbol by applying DFT and IFFT to the complex symbols, and then transmit the DFT-s-OFDM symbol.

In operation 1505, the terminal transmits an MSG3 signal according to a second waveform. Herein, the second waveform may be the CP-OFDM. That is, the terminal generates and transmits the MSG3 signal according to the second waveform. For example, the terminal may generate complex symbols by modulating the message, generate a CP-OFDM symbol by applying IFFT to the complex symbols, and then transmit the CP-OFDM symbol.

Figure 15B:
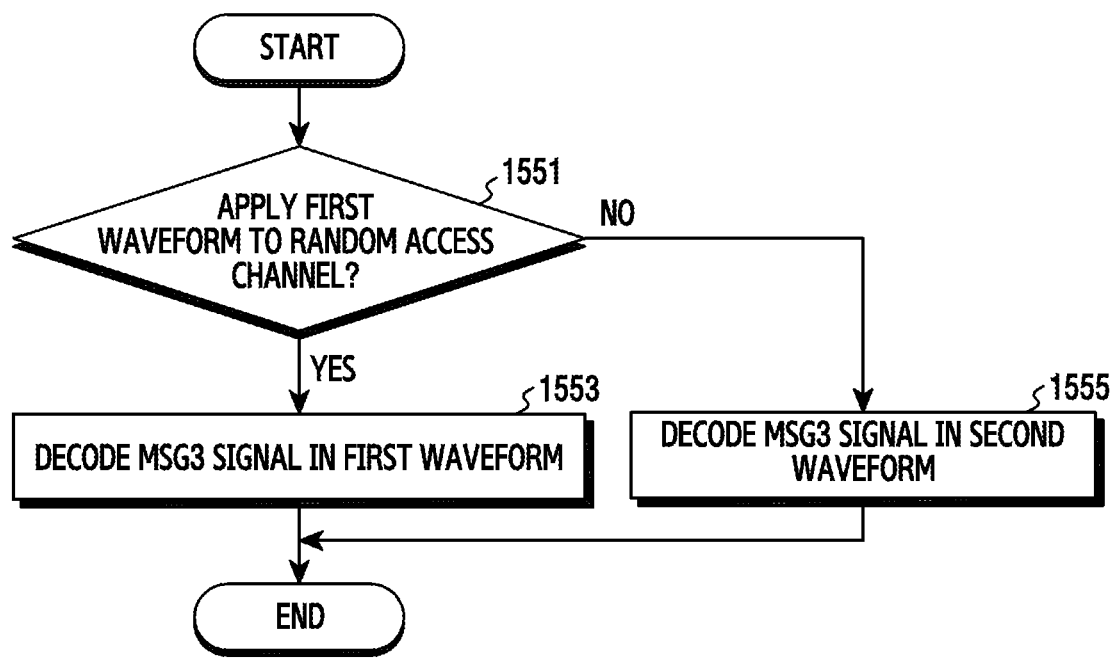
FIG. 15B illustrates an operating method of a base station for determining a waveform for an MSG3 based on a waveform applied to an MSG1 in a wireless communication system according to an embodiment of the disclosure.

FIG. 15B illustrates an operating method of a base station for determining a waveform for an MSG3 based on a waveform applied to an MSG1 in a wireless communication system according to an embodiment of the disclosure. FIG. 15B illustrates the operating method of the base station 110.

Referring to FIG. 15B, in operation 1551, the base station determines whether a first waveform is applied to a random access channel. For example, the base station may determine the waveform applied to the random access channel, using blind detection based on a plurality of waveforms for a random access preamble received over the random access channel. Alternatively, the base station may determine the waveform applied to the random access channel, based on a sequence of the random access preamble or another signal received with the random access preamble.

When the waveform applied to the random access channel is the first waveform, the base station decodes an MSG3 signal in the first waveform, in operation 1553. Herein, the first waveform may be the DFT-s-OFDM. That is, the base station processes the MSG3 signal in a manner corresponding to the first waveform. For example, the base station may restore complex symbols by applying FFT and IDFT to a received signal.

When the waveform applied to the random access channel is not the first waveform, that is, when the waveform applied to the random access channel is a second waveform, the base station decodes an MSG3 signal in the second waveform, in operation 1555. Herein, the second waveform may be the CP-OFDM. That is, the base station processes the MSG3 signal in a manner corresponding to the second waveform. For example, the base station may restore complex symbols by applying FFT to a received signal.

A fifth method for selectively applying the DFT-s-OFDM and the CP-OFDM to the MSG3 transmits a 1-bit indicator notifying the MSG3 waveform in the system information (e.g., SIB, MIB, etc.). The waveform for the MSG3 may be designated to the DFT-s-OFDM or the CP-OFDM, depending on the 1-bit indicator value (e.g., 0 or 1). According to another embodiment, the 1-bit indicator may be implicitly delivered by control information for another purpose. In this regard, operations of the base station and the terminal shall be described by referring to FIG. 16A through FIG. 16D.

Figure 16A:
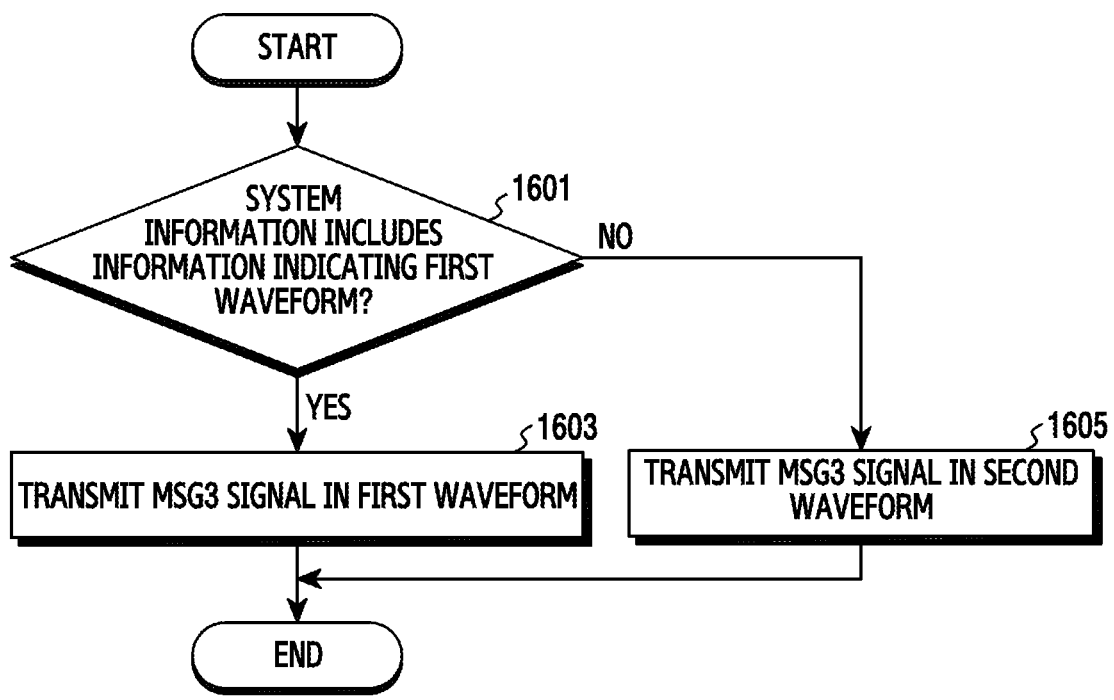
FIG. 16A illustrates an operating method of a terminal for determining a waveform for an MSG3 using system information in a wireless communication system according to an embodiment of the disclosure.

FIG. 16A illustrates an operating method of a terminal for determining a waveform for an MSG3 using system information in a wireless communication system according to an embodiment of the disclosure. FIG. 16A illustrates the operating method of the terminal 120.

Referring to FIG. 16A, in operation 1601, the terminal determines whether system information includes information indicating a first waveform. That is, the system information may include control information indicating the waveform applied to the MSG3. According to an embodiment, the waveform may be indicated by the control information which is defined to indicate the waveform. According to another embodiment, the waveform may be obtained from other control information.

When the control information indicates the first waveform, the terminal transmits an MSG3 signal according to the first waveform, in operation 1603. Herein, the first waveform may be the DFT-s-OFDM. That is, the terminal generates and transmits the MSG3 signal in the first waveform. For example, the terminal may generate complex symbols by modulating the message, generate a DFT-s-OFDM symbol by applying DFT and IFFT to the complex symbols, and then transmit the DFT-s-OFDM symbol.

When the control information does not indicate the first waveform, that is, the control information indicates a second waveform, the terminal transmits an MSG3 signal according to a second waveform, in operation 1605. That is, the terminal generates and transmits the MSG3 signal according to the second waveform. For example, the terminal may generate complex symbols by modulating the message, generate a CP-OFDM symbol by applying IFFT to the complex symbols, and then transmit the CP-OFDM symbol.

Figure 16B:
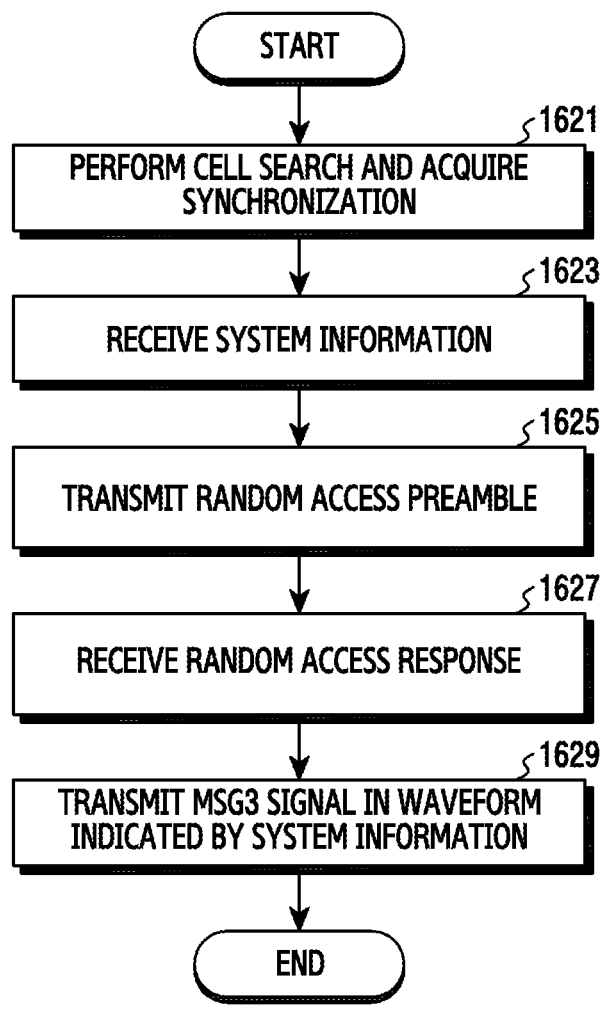
FIG. 16B illustrates another operating method of a terminal for determining a waveform for an MSG3 using system information in a wireless communication system according to an embodiment of the disclosure.

FIG. 16B illustrates another operating method of a terminal for determining a waveform for an MSG3 using system information in a wireless communication system according to various embodiments of the disclosure. FIG. 16B illustrates the operating method of the terminal 120.

Referring to FIG. 16B, in operation 1621, the terminal performs cell search and acquires synchronization for the base station. Specifically, the terminal may determine presence of the base station based on signal detection, and then acquire frame synchronization by detecting a synchronization signal.

In operation 1623, the terminal receives system information. For example, the system information may include at least one of MIB and SIB. The system information may be transmitted over a channel of a predefined location. According to various embodiments, the system information may include control information indicating a waveform applied to the MSG3. According to an embodiment, the waveform may be indicated by the control information which is defined to indicate the waveform. According to another embodiment, the waveform may be obtained from other control information.

In operation 1625, the terminal transmits a random access preamble. Specifically, the terminal selects one sequence allocated for initial access from sequences defined for the random access preamble, and generates an OFDM symbol including the selected sequence according to the identified format. Next, the terminal transmits the OFDM symbol.

In operation 1627, the terminal receives a random access response. The random access response includes information about the sequence transmitted by the terminal, and information about a resource allocated to transmit the message (e.g., the MSG3).

In operation 1629, the terminal transmits an MSG3 signal according to the waveform indicated by the system information. For example, the terminal may apply the CP-OFDM format or the DFT-s-OFDM format.

Figure 16C:
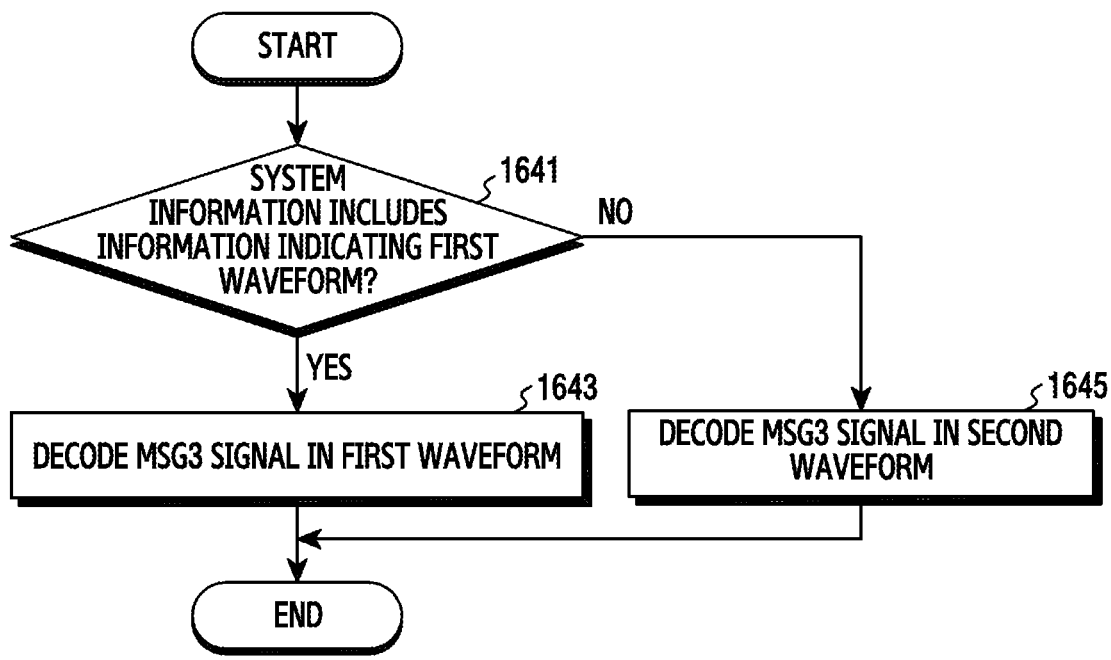
FIG. 16C illustrates an operating method of a base station for determining a waveform for an MSG3 using system information in a wireless communication system according to an embodiment of the disclosure.

FIG. 16C illustrates an operating method of a base station for determining a waveform for an MSG3 using system information in a wireless communication system according to an embodiment of the disclosure. FIG. 16C illustrates the operating method of the base station 110.

Referring to FIG. 16C, in operation 1641, the base station determines whether system information includes information indicating a first waveform. That is, the system information may include control information indicating a waveform applied to the MSG3. According to an embodiment, the waveform may be indicated by the control information which is defined to indicate the waveform. According to another embodiment, the waveform may be obtained from other control information.

When the control information indicates the first waveform, the base station decodes an MSG3 signal in the first waveform, in operation 1643. Herein, the first waveform may be the DFT-s-OFDM. That is, the base station processes the MSG3 signal in a manner corresponding to the first waveform. For example, the base station may restore complex symbols by applying FFT and IDFT to the received signal.

When the control information does not indicate the first waveform, that is, when the control information indicates a second waveform, the base station may decode an MSG3 signal in the second waveform, in operation 1645. Herein, the second waveform may be the CP-OFDM. That is, the base station processes the MSG3 signal in a manner corresponding to the second waveform. For example, the base station may restore complex symbols by applying the FFT to the received signal.

Figure 16D:
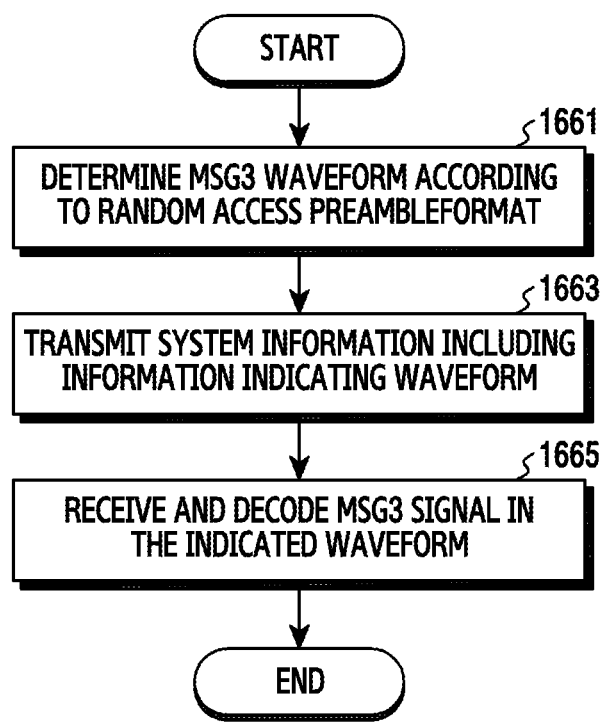
FIG. 16D illustrates another operating method of a base station for determining a waveform for an MSG3 using system information in a wireless communication system according to an embodiment of the disclosure.

FIG. 16D illustrates another operating method of a base station for indicating a waveform for MSG3 using system information in a wireless communication system according to an embodiment of the disclosure. FIG. 16D illustrates the operating method of the base station 110.

Referring to FIG. 16D, in operation 1661, the base station determines a waveform for MSG3 according to a format of a random access preamble. For example, when the preamble format is 0, 2, or 4, the base station may select CP-OFDM as the MSG3 waveform. When the preamble format is 1 or 3, the base station may select DFT-s-OFDM as the MSG3 waveform.

In operation 1663, the base station transmits system information including information indicating the waveform. Herein, the system information may include at least one of MIB and SIM. The system information may include control information indicating the waveform applied to the MSG3. According to an embodiment, the MSG3 waveform may be indicated by the control information which is defined to indicate the waveform. According to another embodiment, the MSG3 waveform may be obtained from other control information.

In operation 1665, the base station receives and decodes an MSG3 signal in the indicated waveform. The base station processes the MSG3 signal in a manner corresponding to the first waveform or the second waveform. For example, when the system information indicates the CP-OFDM, the base station may restore complex symbols by applying the FFT to the received signal. For example, when the system information indicates the DFT-s-OFDM, the base station may restore complex symbols by applying the FFT and the IDFT to the received signal.

A sixth method for selecting applying the DFT-s-OFDM and the CP-OFDM to the MSG3 transmits a 2-bit indicator notifying the MSG1 waveform and the MSG3 waveform in the system information (e.g., SIB, MIB, etc.). The MSG1 waveform and the MSG3 waveform may be designated to the DFT-s-OFDM or the CP-OFDM respectively, depending on a 2-bit indicator value (e.g., 00, 01, 10, or 11). In this regard, operations of the base station and the terminal shall be described by referring to FIG. 17A and FIG. 17B.

Figure 17A:
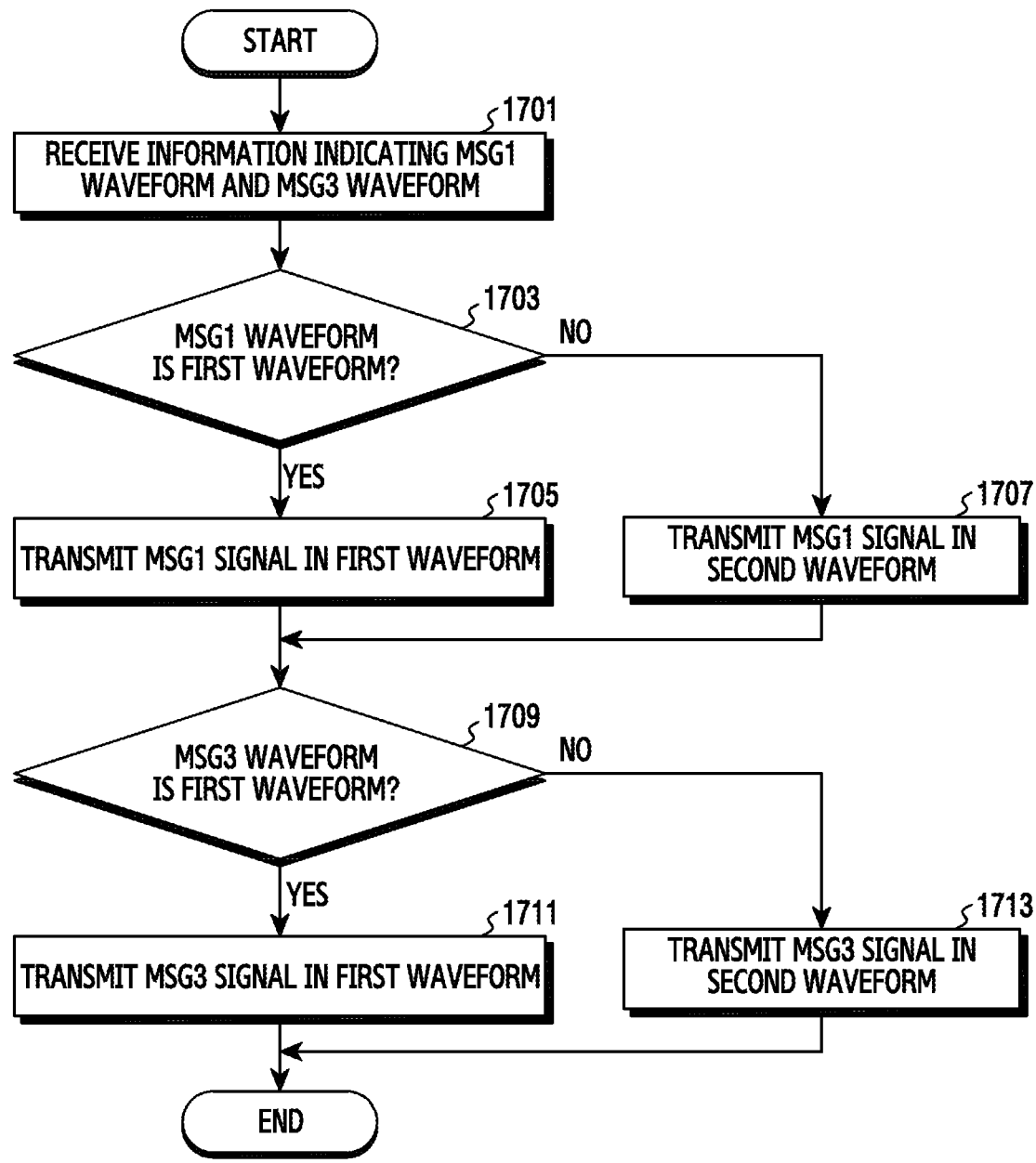
FIG. 17A illustrates an operating method of a terminal for determining a waveform for an MSG1 and a waveform for an MSG3 using system information in a wireless communication system according to an embodiment of the disclosure.

FIG. 17A illustrates an operating method of a terminal for determining an MSG1 waveform and an MSG3 waveform using system information in a wireless communication system according to an embodiment of the disclosure. FIG. 17A illustrates the operating method of the terminal 120.

Referring to FIG. 17A, in operation 1701, the terminal receives information indicating an MSG1 waveform and an MSG3 waveform. The information indicating the MSG1 waveform and the MSG3 waveform may be included in system information.

In operation 1703, the terminal determines whether the MSG1 waveform is a first waveform. When the MSG1 waveform is the first waveform, the terminal transmits an MSG1 signal according to the first waveform, in operation 1705. Herein, the first waveform may be the DFT-s-OFDM. More specifically, the terminal may select one sequence allocated for the initial access among sequences defined for a random access preamble, and generate and transmit a DFT-s-OFDM symbol including the selected sequence.

By contrast, when the MSG1 waveform is a second waveform, the terminal transmits an MSG1 signal according to the second waveform, in operation 1707. Herein, the second waveform may be the CP-OFDM. More specifically, the terminal may select one sequence allocated for the initial access among sequences defined for the random access preamble, and generate and transmit a CP-OFDM symbol including the selected sequence.

In operation 1709, the terminal determines whether the MSG3 waveform is the first waveform. When the MSG3 waveform is the first waveform, the terminal transmits an MSG3 signal according to the first waveform, in operation 1711. Herein, the first waveform may be the DFT-s-OFDM. That is, the terminal generates and transmits the MSG3 signal in the first waveform. For example, the terminal may generate complex symbols by modulating a message, generate a DFT-s-OFDM symbol by applying DFT and IFFT to the complex symbols, and transmit the DFT-s-OFDM symbol.

When the MSG3 waveform is the second waveform, the terminal transmits an MSG3 signal according to the second waveform, in operation 1713. Herein, the second waveform may be the CP-OFDM. That is, the terminal generates and transmits the MSG3 signal in the second waveform. For example, the terminal may generate complex symbols by modulating a message, generate a CP-OFDM symbol by applying the IFFT to the complex symbols, and transmit the CP-OFDM symbol.

Figure 17B:
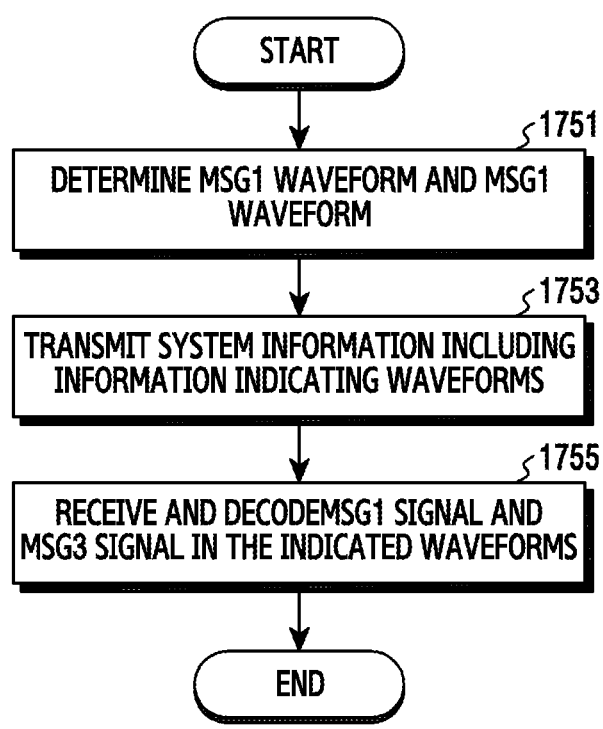
FIG. 17B illustrates an operating method of a base station for indicating a waveform for an MSG1 and a waveform for an MSG3 using system information in a wireless communication system according to an embodiment of the disclosure.

FIG. 17B illustrates an operating method of a base station for indicating an MSG1 waveform and an MSG3 waveform using system information in a wireless communication system according to an embodiment of the disclosure. FIG. 17B illustrates the operating method of the base station 110.

Referring to FIG. 17B, in operation 1751, the base station determines an MSG1 waveform and an MSG3 waveform. For example, the MSG1 waveform may be determined by a cell coverage size. The MSG3 waveform may be determined based on the MSG1 waveform, or on a separate basis.

In operation 1753, the base station transmits system information including information indicating the waveforms. Namely, the base station generates the system information including control information indicative of the MSG1 waveform and control information indicative of the MSG3 waveform. The base station transmits the system information over a channel defined for the system information.

In operation 1755, the base station receives and decodes an MSG1 signal and an MSG3 signal based on the indicated waveforms. Herein, the waveforms may be the CP-OFDM or the DFT-s-OFDM. The MSG1 waveform and the MSG3 waveform may be identical or different from each other.

A seventh method for selectively applying the DFT-s-OFDM and the CP-OFDM to the MSG3 transmits a 1-bit indicator notifying the waveform for both of the MSG1 and the MSG3 in the system information (e.g., SIB, MIB, etc.). The waveform for the MSG1 and the MSG3 may be designated to the DFT-s-OFDM or the CP-OFDM, depending on a 1-bit indicator value (e.g., 0 or 1). In this regard, operations of the base station and the terminal shall be described by referring to FIG. 18A and FIG. 18B.

Figure 18A:
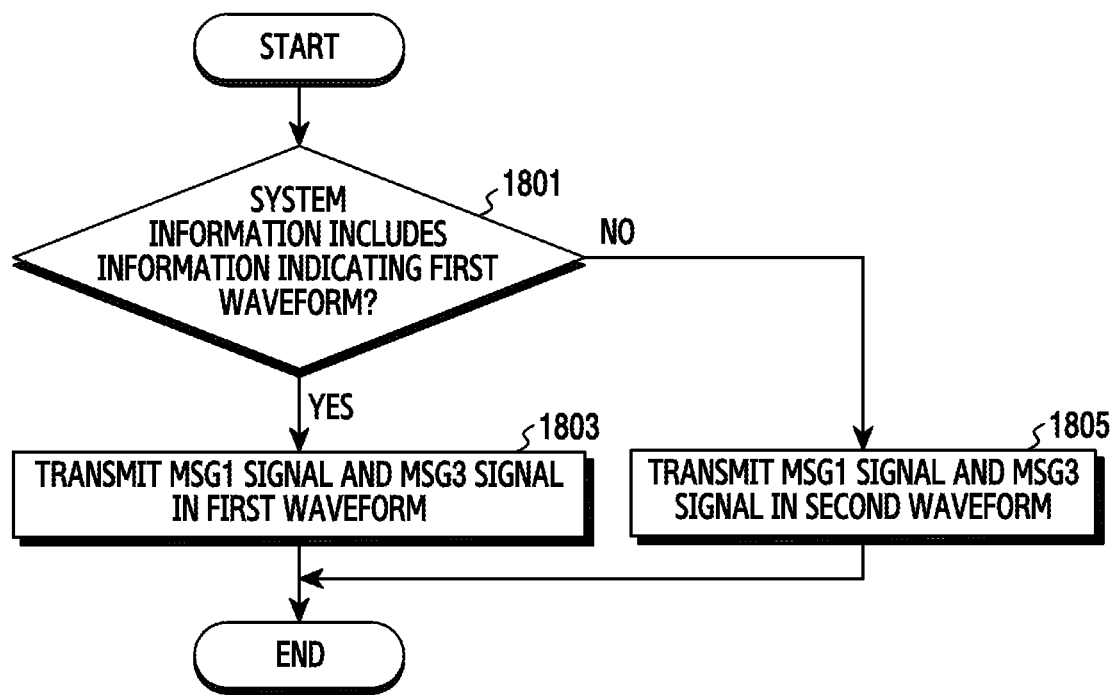
FIG. 18A illustrates an operating method of a terminal for determining a single waveform for an MSG1 and an MSG3 using system information in a wireless communication system according to an embodiment of the disclosure.

FIG. 18A illustrates an operating method of a terminal for determining a single waveform for an MSG1 and an MSG3 using system information in a wireless communication system according to an embodiment of the disclosure. FIG. 18A illustrates the operating method of the terminal 120.

Referring to FIG. 18A, in operation 1801, the terminal determines whether system information includes information indicating a first waveform. That is, the system information may include control information indicating a waveform applied to MSG1 and MSG3. According to an embodiment, the waveform may be indicated by the control information which is defined to indicate the waveform. According to another embodiment, the waveform may be obtained from other control information.

When the control information indicates the first waveform, the terminal transmits an MSG1 signal and an MSG3 signal in the first waveform, in operation 1803. Herein, the first waveform may be the DFT-s-OFDM. In this case, the terminal may transmit a DFT-s-OFDM symbol including a sequence selected for the MSG1, receive a random access response, and then transmit a DFT-s-OFDM symbol including the MSG3.

When the control information does not indicate the first waveform, that is, when the control information indicates a second waveform, the terminal transmits an MSG1 signal and an MSG3 signal in the second waveform, in operation 1805. Herein, the second waveform may be the CP-OFDM. In this case, the terminal may transmit a CP-OFDM symbol including a sequence selected for the MSG1, receive a random access response, and then transmit a CP-OFDM symbol including the MSG3.

Figure 18B:
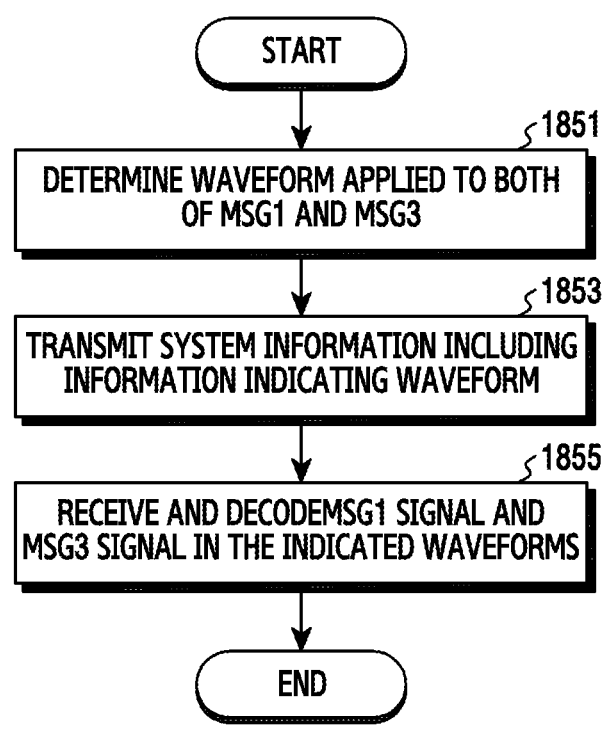
FIG. 18B illustrates an operating method of a base station for indicating a single waveform for an MSG1 and an MSG3 using system information in a wireless communication system according to an embodiment of the disclosure.

FIG. 18B illustrates an operating method of a base station for indicating a single waveform for an MSG1 and an MSG3 using system information in a wireless communication system according to an embodiment of the disclosure. FIG. 18B illustrates the operating method of the base station 110.

Referring to FIG. 18B, in operation 1851, the base station determines a waveform applied to both of MSG1 and MSG3. For example, the base station may determine the waveform for the MSG1 and the MSG3, based on at least one of a cell coverage size and a preamble format.

In operation 1853, the base station transmits system information including information indicating the waveform. Herein, the system information may include control information indicating the waveform applied to the MSG1 and the MSG3. According to an embodiment, the waveform may be indicated by the control information which is defined to indicate the waveform. According to another embodiment, the waveform may be obtained from other control information.

In operation 1855, the base station receives and decodes an MSG1 signal and an MSG3 signal based on the indicated waveform. Herein, the waveforms may include CP-OFDM or DFT-s-OFDM. The MSG1 waveform and the MSG3 waveform are identical.

According to various embodiments as described above, the waveform applied to the message transmitted through the allocated resource in response to the random access preamble, that is, the MSG3, may be determined. Hence, the disclosure explains embodiments for determining the waveform of the MSG1. Depending on which sequences are used for the MSG1, an advantage of a coverage enhancement based on the waveform may be obtained. For example, a ZC sequence may be used as in LTE.

Figure 19:
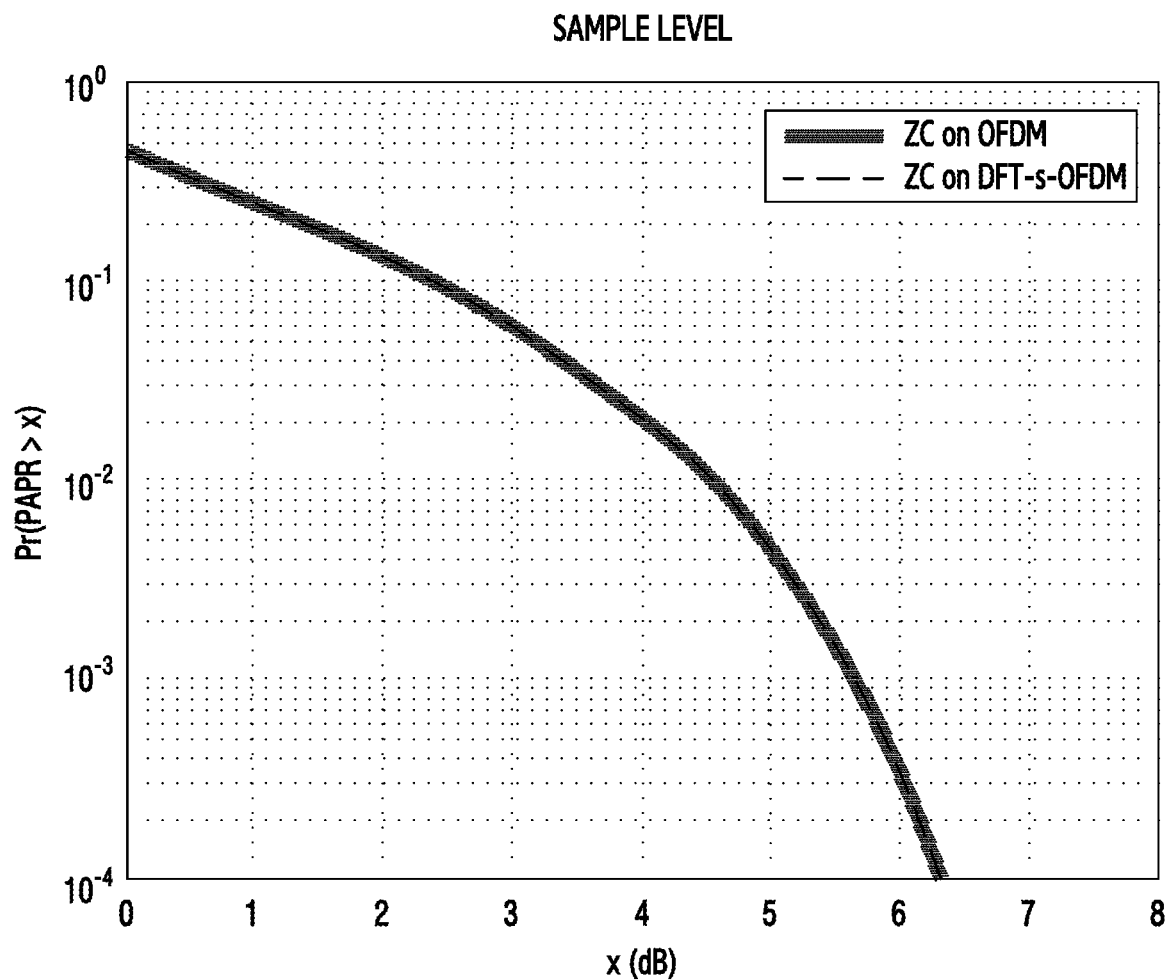
FIG. 19 illustrates a peak to average power ratio (PAPR) based on a Zadoff Chu (ZC) sequence waveform in a wireless communication system according to an embodiment of the disclosure.

FIG. 19 illustrates a PAPR based on a ZC sequence waveform in a wireless communication system according to an embodiment of the disclosure.

Referring to FIG. 19, since the ZC sequence has a constant envelope in time and frequency, the CP-OFDM waveform and the DFT-s-OFDM waveform exhibit the same PAPR characteristic on average, as shown in FIG. 19.

Using a sequence not having the constant envelope in the time/frequency, rather than the ZC sequence, the coverage expansion based on the waveform may be expected as in the MSG3. Unlike the MSG3, when the dual waveform is applied to the MSG1, the DFT-s-OFDM may acquire the coverage and the CP-OFDM may achieve frequency resource efficiency and reduce receive complexity.

A first method for applying the dual waveform to the MSG1 selectively applies the CP-OFDM or the DFT-s-OFDM, according to the preamble format. The cell coverage may be estimated based on the preamble format of Table 1, and the waveform of the MSG1 may be determined to be the CP-OFDM or the DFT-s-OFDM based on the preamble format. For example, the base station informs the terminal of an adequate preamble format, using the RACH configuration based on its cell coverage. The terminal may estimate the cell coverage based on the preamble format and determine the MSG1 waveform based on the estimated cell coverage. In this regard, operations of the base station and the terminal shall be described by referring to FIG. 20A and FIG. 20B.

Figure 20A:
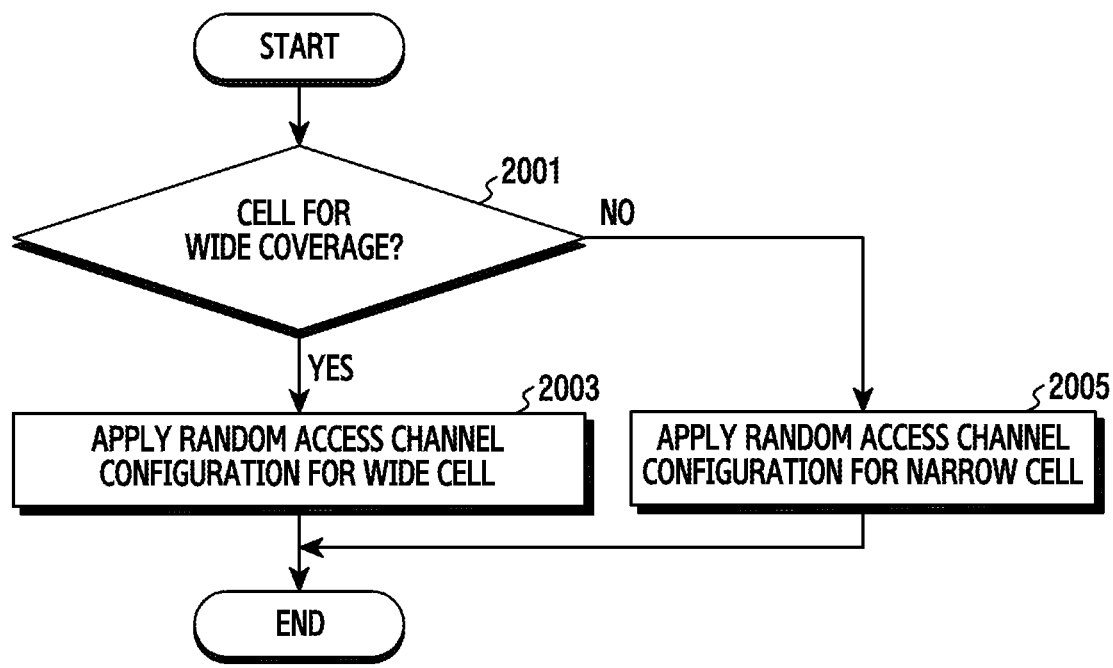
FIG. 20A illustrates an operating method of a base station for determining a waveform for an MSG1 based on a preamble format in a wireless communication system according to an embodiment of the disclosure.

FIG. 20A illustrates an operating method of a base station for determining a waveform for an MSG1 based on a preamble format in a wireless communication system according to an embodiment of the disclosure. FIG. 20A illustrates the operating method of the base station 110.

Referring to FIG. 20A, in operation 2001, the base station determines whether the cell of the base station is for large coverage. The cell coverage of the base station may be determined at the phase of deployment. Accordingly, the base station determines whether its cell is for large coverage, based on an internal system parameter.

In response to the large coverage cell, the base station applies a random access channel configuration for the large cell in operation 2003. For example, the base station configures the preamble 1 or 3. Hence, the base station transmits RACH configuration information notifying the preamble format 1 or 3.

By contrast, when the cell is not for the large coverage, the base station applies a random access channel configuration for a small cell, in operation 2005. For example, the base station configures the preamble 0, 2, or 4. Hence, the base station transmits RACH configuration information notifying the preamble format 0, 2, or 4.

Figure 20B:
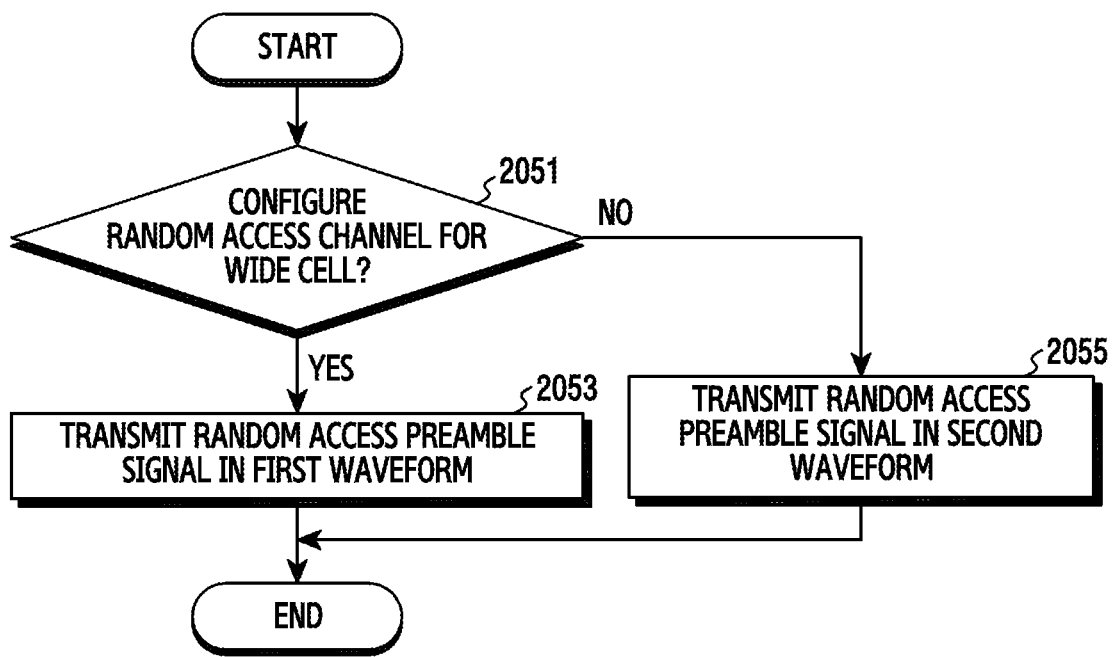
FIG. 20B illustrates an operating method of a terminal for determining a waveform for an MSG1 based on a preamble format in a wireless communication system according to an embodiment of the disclosure.

FIG. 20B illustrates an operating method of a terminal for determining a waveform for an MSG1 based on a preamble format in a wireless communication system according to an embodiment of the disclosure. FIG. 20B illustrates the operating method of the terminal 120.

Referring to FIG. 20B, in operation 2051, the terminal determines whether a random access channel for a large cell is configured. Whether the random access channel for the large cell is configured may be determined based on preamble format information. That is, the terminal may receive system information from the base station, identify the preamble format information from RACH configuration information regarding the system information, and then determine whether the random access channel for the large cell is configured.

When the random access channel for the large cell is configured, the terminal transmits a random access preamble according to a first waveform, in operation 2053. For example, the first waveform may be the DFT-s-OFDM. In this case, the terminal selects one sequence allocated for initial access, among sequences defined for the random access preamble, generates a DFT-s-OFDM symbol including the selected sequence by applying DFT and IFFT, and transmits the DFT-s-OFDM symbol.

When the random access channel for the large cell is not configured, the terminal transmits a random access preamble according to a second waveform, in operation 2055. For example, the second waveform may be the CP-OFDM. In this case, the terminal selects one sequence allocated for the initial access, among the sequences defined for the random access preamble, generates a CP-OFDM symbol including the selected sequence by applying IFFT, and transmits the CP-OFDM symbol.

A second method for applying the dual waveform to the MSG1 transmits a 1-bit indicator which notifies the MSG1 waveform in the system information (e.g., SIB). The waveform for the MSG1 may be designated to the DFT-s-OFDM or the CP-OFDM, depending on a 1-bit indicator value (e.g., 0 or 1). In this regard, operations of the base station and the terminal shall be described by referring to FIG. 21A and FIG. 21B.

Figure 21A:
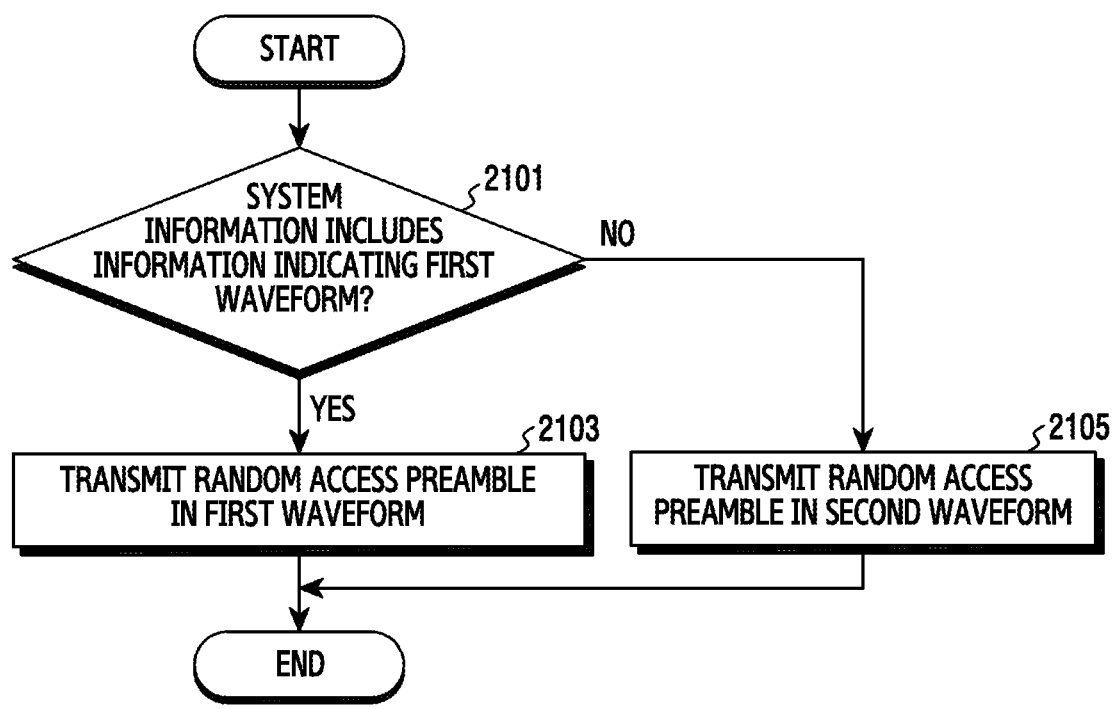
FIG. 21A illustrates an operating method of a terminal for determining a waveform for an MSG1 using system information in a wireless communication system according to an embodiment of the disclosure.
Figure 21B:
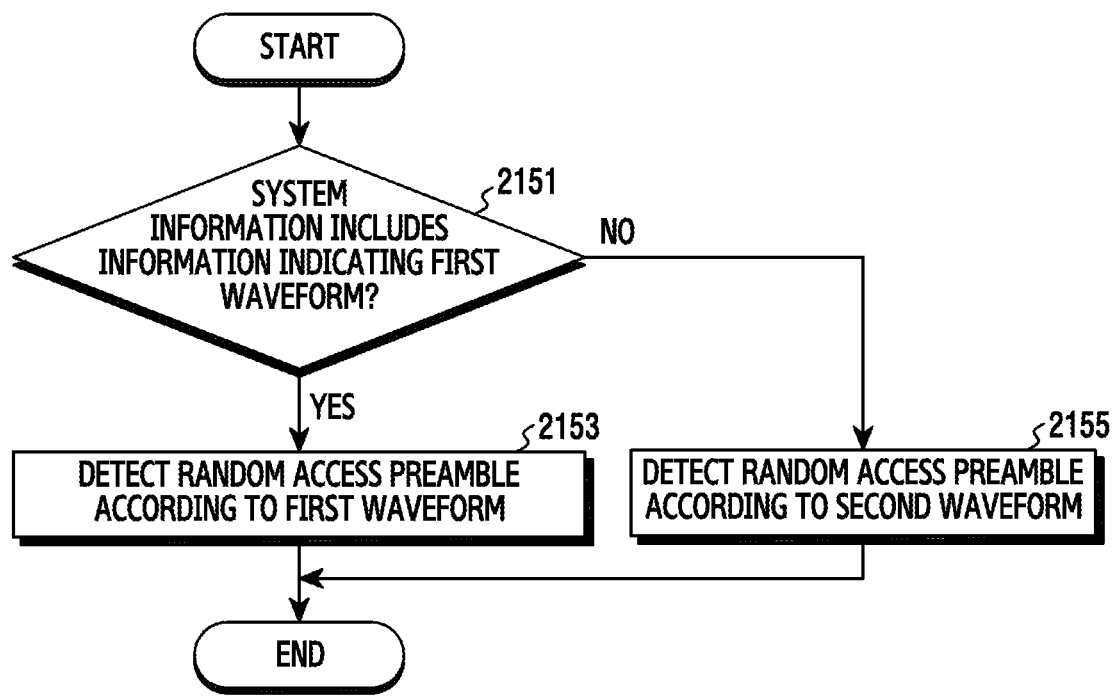
FIG. 21B illustrates an operating method of a base station for indicating a waveform for an MSG1 using system information in a wireless communication system according to an embodiment of the disclosure.

FIG. 21A illustrates an operating method of a terminal for determining a waveform for an MSG1 using system information in a wireless communication system according to an embodiment of the disclosure. FIG. 21B illustrates the operating method of the terminal 120.

Referring to FIG. 21A, in operation 2101, the terminal determines whether system information includes information indicating a first waveform. Herein, the system information may be SIB or MIB. The system information may include control information indicating a waveform applied to the MSG1. According to an embodiment, the waveform may be indicated by the control information which is defined to indicate the waveform. According to another embodiment, the waveform may be obtained from other control information.

When the control information indicates the first waveform, the terminal transmits a random access preamble according to the first waveform, in operation 2103. For example, the first waveform may be the DFT-s-OFDM. In this case, the terminal selects one sequence allocated for initial access, among sequences defined for the random access preamble, generates a DFT-s-OFDM symbol including the selected sequence by applying DFT and IFFT, and transmits the DFT-s-OFDM symbol.

When the control information indicates a second waveform, the terminal transmits a random access preamble according to the second waveform, in operation 2105. For example, the second waveform may be the CP-OFDM. In this case, the terminal selects one sequence allocated for the initial access, among the sequences defined for the random access preamble, generates a CP-OFDM symbol including the selected sequence by applying IFFT, and transmits the CP-OFDM symbol.

FIG. 21B illustrates an operating method of a base station for indicating a waveform for an MSG1 using system information in a wireless communication system according to an embodiment of the disclosure. FIG. 21B illustrates the operating method of the base station 110.

Referring to FIG. 21B, in operation 2151, the base station determines whether system information includes information indicating a first waveform. The system information may include control information indicating a waveform applied to the MSG1. According to an embodiment, the waveform may be indicated by the control information which is defined to indicate the waveform. According to another embodiment, the waveform may be obtained from other control information.

When the control information indicates the first waveform, the base station detects a random access preamble according to the first waveform, in operation 2153. Herein, the first waveform may be the DFT-s-OFDM. In this case, the base station may restore complex symbols indicating a sequence selected by the terminal, by applying FFT and IDFT to a received signal.

When the control information indicates a second waveform, the base station detects a random access preamble according to the second waveform, in operation 2155. Herein, the second waveform may be the CP-OFDM. In this case, the base station may restore the complex symbols indicating the sequence selected by the terminal, by applying FFT to the received signal.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network such as Internet, Intranet, local area network (LAN), Large LAN (WLAN), or storage area Network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

The apparatus and the method according to various embodiments of the disclosure may achieve the larger coverage and support the dynamic TDD, by controlling the waveform of the uplink signal of the idle terminal in the initial access.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    transmitting, to a base station, a random access preamble signal according to a format of the random access preamble signal;
    receiving, from the base station, system information;
    identifying whether information indicating a discrete Fourier transform (DFT)-spread (s)-orthogonal frequency division multiplexing (OFDM) waveform for a waveform of a message3 (MSG3) associated with random access procedure is absent in the system information or not, wherein the waveform is a cyclic prefix (CP)-OFDM waveform or the DFT-s OFDM waveform, and the waveform of the MSG3 defaults to the CP-OFDM waveform;
    in case that the information indicating the DFT-s OFDM waveform is absent in the system information, identifying that the waveform of the MSG3 is the CP-OFDM waveform set by default without information indicating the CP-OFDM waveform;
    receiving, from the base station, a random access response; and
    transmitting, to the base station, the MSG3 and a demodulation reference signal (DMRS) based on the waveform,
    wherein the information indicating the DFT-s OFDM waveform is identified based on the format of the random access preamble signal,
    wherein, in case that the information indicating the DFT-s OFDM waveform is absent in the system information, the MSG3 is generated by the CP-OFDM waveform without a DFT spreading used for the DFT-s OFDM waveform, and
    wherein, in case that the information indicating the DFT-s OFDM waveform is present in the system information, the MSG3 is generated by the DFT-s OFDM waveform with the DFT spreading used for the DFT-s OFDM waveform.

2. The method of claim 1,
wherein the system information includes random access channel (RACH) configuration for the random access preamble signal,
wherein the random access response includes uplink grant for the MSG3, and
wherein the waveform is cell-specifically determined.

3. The method of claim 1, wherein the demodulation reference signal is generated based on the waveform.

4. The method of claim 1,
wherein the information indicating the DFT-s OFDM waveform is present in the system information in case that the format of the random access preamble signal is 1 or 3, and
wherein the information indicating the DFT-s OFDM waveform is absent in the system information in case that the format of the random access preamble signal is 0, 2 or 4.

5. A method performed by a base station in a wireless communication system, the method comprising:
receiving, from a terminal, a random access preamble signal according to a format of the random access preamble signal;
identifying whether a waveform of a message3 (MSG3) associated with random access procedure is a discrete Fourier transform (DFT)-spread (s)-orthogonal frequency division multiplexing (OFDM) waveform using a DFT spreading or a cyclic prefix (CP)-OFDM waveform not using the DFT spreading based on the format of the random access preamble signal, wherein the waveform of the MSG3 defaults to the CP-OFDM waveform;
transmitting, to a terminal, system information for indicating the DFT-s OFDM waveform or the CP-OFDM waveform;
transmitting, to the terminal, a random access response; and
receiving, from the terminal, the MSG3 and a demodulation reference signal (DMRS) based on the waveform,
wherein the DFT-s OFDM waveform is indicated by a presence of information indicating the DFT-s OFDM waveform for the waveform of the MSG3 in the system information,
wherein the CP-OFDM waveform is indicated without information indicating the CP-OFDM waveform by an absence of the information indicating the DFT-s OFDM waveform for the waveform of the MSG3 in the system information.

6. The method of claim 5,
wherein the system information includes random access channel (RACH) configuration for the random access preamble signal,
wherein the random access response includes uplink grant for the MSG3, and
wherein the waveform is cell-specifically determined.

7. The method of claim 5, wherein the demodulation reference signal is generated based on the waveform.

8. The method of claim 5,
wherein the information indicating the DFT-s OFDM waveform is present in the system information in case that the format of the random access preamble signal is 1 or 3, and
wherein the information indicating the DFT-s OFDM waveform is absent in the system information in case that the format of the random access preamble signal is 0, 2 or 4.

9. A terminal in a wireless communication system, the terminal comprising:
a transceiver; and
at least one processor connected to the transceiver,
wherein the at least one processor is configured to:
control the transceiver to transmit, to a base station, a random access preamble signal according to a format of the random access preamble signal;
control the transceiver to receive, from the base station, system information;
identify whether information indicating a discrete Fourier transform (DFT)-spread (s)-orthogonal frequency division multiplexing (OFDM) waveform for a waveform of a message3 (MSG3) associated with random access procedure is absent in the system information or not, wherein the waveform is a cyclic prefix (CP)-OFDM waveform or the DFT-s OFDM waveform, and the waveform of the MSG3 defaults to the CP-OFDM waveform;
in case that the information indicating the DFT-s OFDM waveform is absent in the system information, identify that the waveform of the MSG3 is the CP-OFDM waveform set by default without information indicating the CP-OFDM waveform;
control the transceiver to receive, from the base station, a random access response; and
control the transceiver to transmit, to the base station, the MSG3 and a demodulation reference signal (DMRS) based on the waveform,
wherein the information indicating the DFT-s OFDM waveform is identified based on the format of the random access preamble signal,
wherein, in case that the information indicating the DFT-s OFDM waveform is absent in the system information, the MSG3 is generated by the CP-OFDM waveform without a DFT spreading used for the DFT-s OFDM waveform, and
wherein, in case that the information indicating the DFT-s OFDM waveform is present in the system information, the MSG3 is generated by the DFT-s OFDM waveform with the DFT spreading used for the DFT-s OFDM waveform.

10. The terminal of claim 9,
wherein the system information includes random access channel (RACH) configuration for the random access preamble signal,
wherein the random access response includes uplink grant for the MSG3, and
wherein the waveform is cell-specifically determined.

11. The terminal of claim 9, wherein the demodulation reference signal is generated based on the waveform.

12. The terminal of claim 9,
wherein the information indicating the DFT-s OFDM waveform is present in the system information in case that the format of the random access preamble signal is 1 or 3, and
wherein the information indicating the DFT-s OFDM waveform is absent in the system information in case that the format of the random access preamble signal is 0, 2 or 4.

13. A base station in a wireless communication system, the base station comprising:
a transceiver; and
at least one processor connected to the transceiver,
wherein the at least one processor is configured to:

receive, from a terminal, a random access preamble signal according to a format of the random access preamble signal;
identify whether a waveform of a message3 (MSG3) associated with random access procedure is a discrete Fourier transform (DFT)-spread (s)-orthogonal frequency division multiplexing (OFDM) waveform using a DFT spreading or a cyclic prefix (CP)-OFDM waveform not using the DFT spreading based on the format of the random access preamble signal, wherein the waveform of the MSG3 defaults to the CP-OFDM waveform;
transmit, to a terminal, system information for indicating the DFT-s OFDM waveform or the CP-OFDM waveform;
receive, from the terminal, a random access preamble signal;
transmit, to the terminal, a random access response; and
receive, from the terminal, the MSG3 and a demodulation reference signal (DMRS) based on the waveform,
wherein the DFT-s OFDM waveform is indicated by a presence of information indicating the DFT-s OFDM waveform for the waveform of the MSG3 in the system information, and
wherein the CP-OFDM waveform is indicated without information indicating the CP-OFDM waveform by an absence of the information indicating the DFT-s OFDM waveform for the waveform of the MSG3 in the system information.

14. The base station of claim 13,
wherein the system information includes random access channel (RACH) configuration for the random access preamble signal,
wherein the random access response includes uplink grant for the MSG3, and
wherein the waveform is cell-specifically determined.

15. The base station of claim 13, wherein the demodulation reference signal is generated based on the waveform.

16. The base station of claim 13,
wherein the information indicating the DFT-s OFDM waveform is present in the system information in case that the format of the random access preamble signal is 1 or 3, and
wherein the information indicating the DFT-s OFDM waveform is absent in the system information in case that the format of the random access preamble signal is 0, 2 or 4.

* * * * *